United States Patent
Bostan

(10) Patent No.: US 7,520,466 B2
(45) Date of Patent: Apr. 21, 2009

(54) GYRO-STABILIZED AIR VEHICLE

(76) Inventor: Nicolae Bostan, 1112 S. Cypress Ave. Unit 51, Ontario, CA (US) 91762

( * ) Notice: Subject to any disclaimer, the term of this patent is extended or adjusted under 35 U.S.C. 154(b) by 596 days.

(21) Appl. No.: 11/384,167

(22) Filed: Mar. 17, 2006

(65) Prior Publication Data

US 2006/0231675 A1 Oct. 19, 2006

Related U.S. Application Data

(60) Provisional application No. 60/662,999, filed on Mar. 17, 2005.

(51) Int. Cl.
*B64C 17/00* (2006.01)

(52) U.S. Cl. .................. 244/93; 244/12.4; 244/23 A; 244/12.1; 244/12.3; 244/17.23; 244/17.25; 244/23 R

(58) Field of Classification Search .......... 244/6, 244/12.4, 23 A, 12.1, 12.2, 12.3, 17.23, 17.25, 244/23 R, 23 C, 56, 93; 74/5 R, 5.95

See application file for complete search history.

(56) References Cited

U.S. PATENT DOCUMENTS

| | | | |
|---|---|---|---|
| 1,467,515 A | 9/1923 | Stewart |
| 1,500,572 A | 7/1924 | Brown |
| 1,820,467 A | 8/1931 | Liska |
| 1,824,195 A | 9/1931 | Chillingworth |
| 1,893,936 A | 1/1933 | Eriksson |
| 2,298,576 A | 10/1942 | McElroy et al. |
| 2,388,973 A | 11/1945 | Hofgren |
| 2,874,920 A | 2/1959 | Mallinckrodt |
| 2,952,442 A | 9/1960 | Warnken |
| 2,963,272 A | 12/1960 | Welsh |
| 2,988,308 A | 6/1961 | Czerwinski |
| D193,122 S | 6/1962 | Walker |
| 3,112,904 A | 12/1963 | Reams |
| 3,117,630 A | 1/1964 | Barish |
| 3,122,342 A | 2/1964 | Weir |
| 3,176,413 A | 4/1965 | Dornier et al. |
| 3,193,215 A | 7/1965 | Dunham |
| 3,273,824 A | 9/1966 | Owens |
| 3,288,396 A | 11/1966 | Gouin |
| 3,437,290 A | 4/1969 | Norman |
| 3,458,160 A | 7/1969 | Marchetti |
| 3,482,803 A | 12/1969 | Lindenbaum |
| 3,532,301 A | 10/1970 | Swatton |
| 3,635,426 A | 1/1972 | Stanley |

(Continued)

OTHER PUBLICATIONS

International Search Report and Written Opinion for corresponding PCT Application No. PCT/US06/09965.

*Primary Examiner*—J. Woodrow Eldred
(74) *Attorney, Agent, or Firm*—Knobbe, Martens, Olson & Bear, LLP

(57) ABSTRACT

A vertical takeoff and landing (VTOL) air vehicle disclosed. The air vehicle can be manned or unmanned. In one embodiment, the air vehicle includes two shrouded propellers, a fuselage and a gyroscopic stabilization disk installed in the fuselage. The gyroscopic stabilization disk can be configured to provide sufficient angular momentum, by sufficient mass and/or sufficient angular velocity, such that the air vehicle is gyroscopically stabilized during various phases of flight. In one embodiment the fuselage is fixedly attached to the shrouded propellers. In another embodiment, the shrouded propellers are pivotably mounted to the fuselage.

27 Claims, 19 Drawing Sheets

U.S. PATENT DOCUMENTS

| | | |
|---|---|---|
| 3,695,780 A | 10/1972 | Velkoff |
| 3,752,417 A | 8/1973 | Lagace |
| 3,863,869 A | 2/1975 | Bachman |
| 4,037,807 A | 7/1977 | Johnston et al. |
| 4,076,455 A | 2/1978 | Stargardter |
| 4,232,996 A | 11/1980 | Stoffer |
| 4,312,483 A | 1/1982 | Bostan |
| 4,326,836 A | 4/1982 | Fitton |
| 4,387,867 A | 6/1983 | Jordan |
| 4,461,436 A | 7/1984 | Messina |
| 4,710,102 A | 12/1987 | Ortolano |
| 4,767,270 A | 8/1988 | Seidel |
| 4,773,618 A | 9/1988 | Ow |
| 4,778,128 A | 10/1988 | Wright et al. |
| 4,787,573 A | 11/1988 | Pauchard |
| 4,844,383 A * | 7/1989 | Hassenpflug ................ 244/79 |
| 4,930,984 A | 6/1990 | Kesel et al. |
| 5,086,993 A | 2/1992 | Wainfan |
| 5,096,382 A | 3/1992 | Gratzer |
| 5,120,197 A | 6/1992 | Brooks et al. |
| 5,152,478 A | 10/1992 | Cycon et al. |
| 5,211,540 A | 5/1993 | Evans |
| 5,259,571 A | 11/1993 | Blazquez |
| 5,269,656 A | 12/1993 | Maga |
| 5,297,759 A | 3/1994 | Tilbor et al. |
| 5,419,513 A | 5/1995 | Flemming, Jr. et al. |
| 5,421,538 A | 6/1995 | Vassa |
| 5,437,541 A | 8/1995 | Vainrub |
| 5,498,136 A | 3/1996 | Namura et al. |
| 5,507,453 A | 4/1996 | Shapery |
| 5,727,754 A | 3/1998 | Carter, Jr. |
| 5,829,956 A | 11/1998 | Chen et al. |
| 5,860,620 A | 1/1999 | Wainfan et al. |
| 5,860,788 A | 1/1999 | Sorensen |
| 5,890,441 A | 4/1999 | Swinson et al. |
| 5,961,289 A | 10/1999 | Lohmann |
| 6,015,258 A | 1/2000 | Taylor |
| 6,065,937 A | 5/2000 | Hunt |
| 6,086,016 A | 7/2000 | Meek |
| 6,102,661 A | 8/2000 | Robson et al. |
| 6,241,474 B1 | 6/2001 | Alizadeh et al. |
| 6,435,828 B1 | 8/2002 | Bostwick |
| 6,604,706 B1 | 8/2003 | Bostan |
| 6,708,920 B2 | 3/2004 | Fukuyama |
| 6,907,800 B1 * | 6/2005 | Inman ........................ 74/5.4 |
| 7,044,422 B2 | 5/2006 | Bostan |
| 7,051,608 B2 * | 5/2006 | Guerrero ..................... 74/5.4 |
| 2002/0011539 A1 | 1/2002 | Carter, Jr. |

* cited by examiner

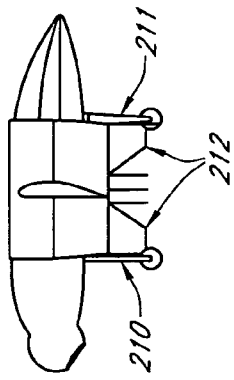
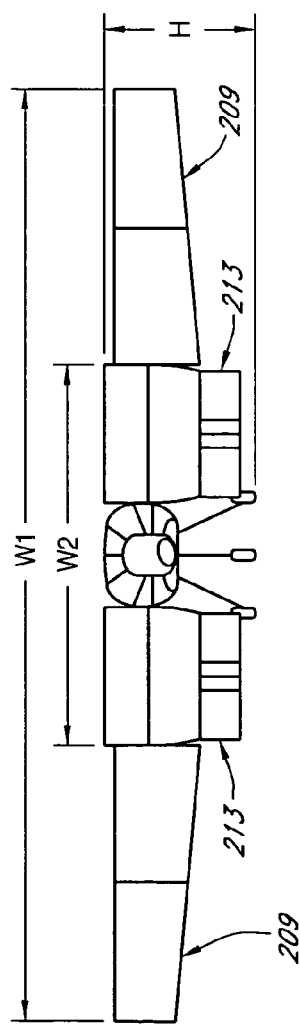
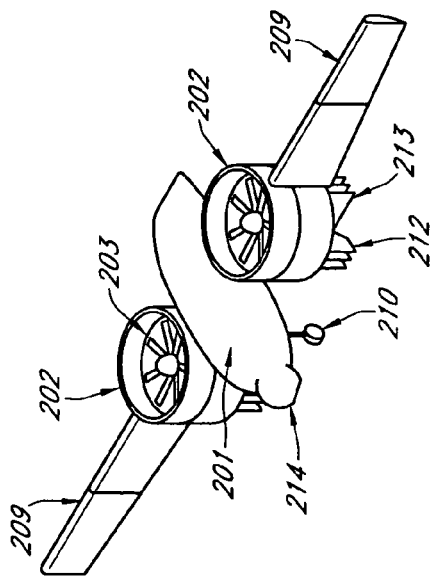
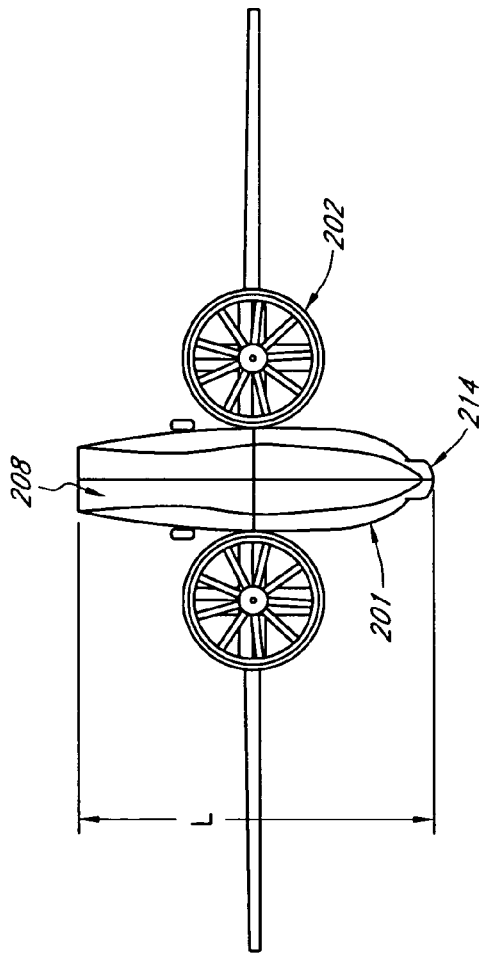
FIG. 17D
FIG. 17A
FIG. 17C
FIG. 17B

GYRO-STABILIZED AIR VEHICLE

PRIORITY CLAIM

This application claims the benefit of U.S. Provisional Application No. 60/662,999, filed on Mar. 17, 2005, entitled "Vertical Takeoff and Landing Air Vehicle with Tilt Shrouded Propellers Gyro Stabilized by a Rotating Disk," which is hereby incorporated by reference in its entirety.

BACKGROUND

1. Field

The present disclosure generally relates to aircraft technology, and in particular, relates to a manned or unmanned vertical takeoff and landing (VTOL) air vehicle that is gyroscopically stabilized to enhance controllability of flight operations.

2. Description of the Related Art

Unmanned air vehicles (UAV) are vehicles that provide tremendous utility in numerous applications. For example, UAVs are commonly used by the military to provide mobile aerial observation platforms that allow for observation of ground sites at reduced risk to ground personnel. A typical UAV used in military applications, and also in other civilian type applications, usually includes an aircraft that has the general configuration of fixed wing aircrafts known in the art. In particular, the typical UAV that is used today has a fuselage with wings extending outward therefrom, control surfaces mounted on the wings, a rudder and an engine that propels the UAV in a generally forward flight. Such UAVs can fly autonomously and/or can be controlled by an operator from a remote location. UAVs of the prior art can thus be used for obtaining photographic images without the risks to a pilot.

A typical UAV takes off and lands like an ordinary airplane. For example, such typical UAV takes off from and lands on a runway, much like a fixed-wing aircraft. In many situations, however, runways may not be available, or their use may be impractical. For example, for military applications, land based runways are often unavailable adjacent to the operational military zone or the available runways will be occupied by larger manned fixed-wing aircraft. Similarly, ship borne UAVs can be even further restricted in available runway space since most military ships are not equipped with sufficient deck space to constitute a runway. Consequently, UAVs are often forced to be launched with expensive catapult equipment and then recaptured using expensive net systems. Such launching and landing can result in damage to the UAV.

A further difficulty faced by airplane-type UAVs is that the UAVs are often insufficiently mobile effective operation in confined airspace. It is often desirable to be able to move the UAV in a confined airspace, such as in an urban setting, at relatively low elevations. Airplane-type UAVs typically travel too fast to operate effectively in these types of environments.

SUMMARY

The foregoing needs can be addressed by various embodiments of a vertical takeoff and landing (VTOL) air vehicle. The air vehicle can be manned or unmanned. In one embodiment, the air vehicle includes two shrouded propulsion assemblies, a fuselage and a gyroscopic stabilization disk installed in the fuselage. The gyroscopic stabilization disk can be configured to provide sufficient angular momentum, by sufficient mass and/or sufficient angular velocity, such that the air vehicle is gyroscopically stabilized during various phases of flight. In one embodiment the fuselage is fixedly attached to the shrouded propulsion assemblies. In another embodiment, the shrouded propulsion assemblies are pivotably mounted to the fuselage. Other configurations are possible.

One embodiment of the present disclosure relates to a manned/unmanned air vehicle which includes a fuselage and two shrouded propulsion assemblies. An engine mounted in the fuselage can transmit its power via gear boxes and interconnecting shafts to the two shrouded propulsion assemblies to thereby provide thrust for the air vehicle. The air vehicle can also include a gyroscopic stabilization member coupled to an electric motor shaft or an engine shaft via a gear box, such that rotation of the shaft results in rotation of the gyroscopic member. The moment of inertia and the rate of rotation of the gyroscopic member can be selected such that the angular momentum of the gyroscopic member is significantly larger than the moment of inertia of the aircraft (in one embodiment, at least 20 times larger), so that the air vehicle is substantially gyroscopically stabilized throughout the substantially entire flight envelope.

In one embodiment, the air vehicle includes a flight control system that is configured to allow control of the flight of the air vehicle during flight. The control system can be configured to permit vertical take-off and landing of the air vehicle via a transition of the orientation of the plane of the shrouded propulsion assemblies with respect to the plane of the ground. When the plane of the shrouded propulsion assemblies is substantially parallel to the plane of the ground, horizontal flight can occur. When the plane of the shrouded propulsion assemblies is substantially perpendicular to the plane of the ground, the air vehicle can take-off from or land on the ground. In one embodiment, gyroscopic stabilization can be provided during such transition.

In one embodiment, the use of a gyroscopic stabilization member in the air vehicle can result in the air vehicle being more stable during the entire flight envelope, as the effects of external and internal moments (such as changes in moments due to fuel consumption or wind gust) result in gyroscopic precession of the air vehicle. As a result of the gyroscopic precession, the changes in direction of flight of the air vehicle can occur approximately 90 degrees in the direction of rotation from the point where the resulting moment is applied. Preferably, the angular momentum of the gyroscopic member is large enough such that possible variations of the vehicle orientation due to wind gust (and/or other effects) can be rapidly suppressed without affecting the air vehicle's position in space.

In one embodiment, the gyroscopic member that rotates as a result of rotation of the electric motor shaft or the engine shaft, includes a disk that is coupled to the drive shaft via a gear assembly such that the disk can be rotated at an angular velocity selected to provide the gyroscopic stabilization for the air vehicle. In one embodiment, the gyroscopic stabilization member is mounted inside the fuselage.

In one embodiment, the flight control system includes a plurality of movable flight control surfaces that can be independently moved so as to provide directional control about the pitch, yaw and roll axes. In one Class II embodiment, in substantially all orientation of flight the gyroscopic stabilization member tilts together with the shrouded propulsion assemblies and provides gyroscopic stabilization about the pitch and yaw axes of the air vehicle. In one Class III embodiment, where the gyroscopic member is substantially solidly attached to the fuselage the gyroscopic member provides gyroscopic stabilization about the pitch and roll axes. The flight control system can be configured to allow the air vehicle to take-off and land, where the plane of rotation of the shrouded propulsion assemblies is substantially parallel to the landing surface.

In one embodiment, the shrouded propulsion assemblies of the air vehicle are further configured such that, following vertical take-off, the plane of the shrouded propulsion assemblies can be oriented so as to have an approximately 5-10 degrees offset from the plane of the ground so as to propel the vehicle in a direction parallel to the plane of the ground at a relatively low speed. The flight control system is further configured to allow the shrouded propulsion assemblies to orient themselves such that the plane of the propellers is substantially perpendicular to the plane of the ground to allow for horizontal flight at high speed. During each of the three general zones of the flight envelope the Class III fuselage can be parallel to the ground. In the first embodiment when gyroscopic stabilization member provides gyroscopic stabilization about the pitch axis and yaw axes which are perpendicular to each other and also perpendicular to the roll axis which comprises the longitudinal axis of the fuselage and the air vehicle.

In one embodiment, the air vehicle can be considerably more stable in operation due to the operation of the gyroscopic stabilization member. Further, the addition of the gyroscopic stabilization member can be an inexpensive way to design an aircraft that is capable of vertical flight, unusual maneuverability and horizontal flight at high speed. The use of shrouded propeller type design provides a vehicle that can be suitable for take-off and landing on confined spaces and surfaces with little preparation, without posing undue risk to the operating personnel standing nearby.

One embodiment of the present disclosure relates to an aircraft for vertical, horizontal or stationary flight. The aircraft includes a fuselage, and two shrouded propulsion assemblies. The aircraft further includes a plurality of control surfaces attached to the shrouded propulsion assemblies for controlling the flight of the aircraft. The aircraft further includes an engine mounted to the fuselage having an engine shaft arranged to rotate about a longitudinal axis of the aircraft. The aircraft further includes two propellers one in each shroud that produces thrust such that the aircraft is in flight and such that air flow is created over the plurality of control surfaces. The aircraft further includes a gyroscopic stabilization member attached to the engine shaft via a gear box such that the gyroscopic stabilization member rotates with an angular momentum that is selected, with respect to the moment of inertia of the aircraft about the axis of rotation of the gyroscopic stabilization member, such that the aircraft is gyroscopically stabilized during flight.

In one embodiment, the gyroscopic stabilization member is a disk rotating about longitudinal axis of the aircraft. In one embodiment, the fuselage housing the gyroscopic stabilization member is solidly attached to the shrouds.

In one embodiment, the gyroscopic stabilization member is a disk rotating about the yaw axis of the aircraft. In one embodiment, the fuselage housing the gyroscopic stabilization member is pivotably attached between the shrouds.

Another embodiment of the present disclosure relates to an aircraft that includes a fuselage and two shrouded propulsion assemblies defining flight surfaces. The fuselage is mounted solidly between the shrouds. The aircraft further includes a plurality of control surfaces attached to the shrouds for controlling the flight of the aircraft. The aircraft further includes an engine mounted in the fuselage. The aircraft further includes two propellers, one mounted in each shroud actuated by the engine via belt drives or gear boxes, that produce thrust such that the aircraft is in flight and such that the airflow is created over the plurality of control surfaces. The engine provides sufficient thrust via the propellers so as to power the aircraft. The engine provides sufficient thrust via the propellers so as to power the aircraft through a flight envelope that includes vertical take off and landing and horizontal flight and transitions therebetween. The aircraft further includes a gyroscopic stabilization member comprising a disk structure actuated via a gear box by the engine, the disk structure situated in the fuselage in between the two shrouded propulsion assemblies.

In one embodiment, the disk has a relatively small cross section, and no portion of the disk extends into the opening of the two shrouds.

Yet another embodiment of the present disclosure relates to an aircraft that includes a fuselage and two shrouded propulsion assemblies defining flight surfaces. The fuselage is mounted pivotably between the shrouds. The aircraft further includes a plurality of control surfaces attached to the shrouds for controlling the flight of the aircraft. The aircraft further includes an engine mounted in the fuselage. The aircraft further includes two propellers, one mounted in each shroud actuated by the engine via interconnecting shafts and gear boxes that produce thrust such that the aircraft is in flight and such that the airflow is created over the plurality of control surfaces. The engine provides sufficient thrust via the propellers so as to power the aircraft. The engine provides sufficient thrust via the propellers so as to power the aircraft through a flight envelope that includes vertical take off and landing and horizontal flight and transitions there between. The aircraft further includes a gyroscopic stabilization member comprising a disk structure actuated via a gear box by the engine, the disk structure situated in the fuselage in between the two shrouded propulsion assemblies.

In one embodiment, the disk has a relatively small cross section, and no portion of the disk extends into the opening of the two shrouds.

Yet another embodiment of the present disclosure relates to an aircraft having a fuselage having a longitudinal axis, and two shrouded propeller assemblies coupled to the fuselage. Each shrouded propeller assembly is spaced laterally from the fuselage and provides thrust, and has one or more control surfaces that direct at least a portion of air flow of the thrust so as to provide flight control of the aircraft. The aircraft further includes an engine positioned within the fuselage and coupled to and providing power to the two shrouded propeller assemblies by a power transfer mechanism. The aircraft further includes a gyroscopic stabilization member positioned within the fuselage and coupled to the power transfer mechanism such that the gyroscopic stabilization member rotates about a rotational axis so as to yield a selected angular momentum with respect to the longitudinal axis and a moment of inertia of the aircraft, and thereby provide gyroscopic stabilization of the aircraft during flight.

In one embodiment, each of the two shrouded propulsion assemblies are mounted to the fuselage in a fixed manner such that axes of rotation of the propellers are substantially fixed with respect to the longitudinal axis of the fuselage. In one embodiment, the aircraft is a Class II UAV. In one embodiment, the aircraft further includes wings that extend laterally from the two shrouded propulsion assemblies so as to provide additional lifting surface during horizontal fight of the aircraft.

In one embodiment, each of the two shrouded propulsion assemblies are mounted to the fuselage in a pivotable manner such that axes of rotation of the propellers can vary with respect to the longitudinal axis of the fuselage. In one embodiment, the aircraft is a Class III UAV. In one embodiment, the aircraft further includes wings that extend laterally from the two shrouded propulsion assemblies so as to provide additional lifting surface during horizontal fight of the aircraft.

In one embodiment, the power transfer mechanism includes an engine shaft, and the gyroscopic stabilization member is driven by the engine shaft via a gear box.

In one embodiment, the rotational axis of the gyroscopic stabilization member is substantially parallel to the longitudinal axis of the fuselage. In one embodiment, the rotational axis of the gyroscopic stabilization member is substantially perpendicular to the longitudinal axis of the fuselage.

In one embodiment, the gyroscopic stabilization member comprises a disk. In one embodiment, the disk has a mass distribution that varies with radial distance from its rotational axis. In one embodiment, the disk spinning at an operational rotational rate has an angular momentum that is about 10 to 20 times or greater than the static moment of inertia of the aircraft about the rotational axis of the disk.

In one embodiment, the aircraft further includes a flight control component configured to receive an input signal indicative of a need or a desire to change an attitude of the aircraft, and generate an output signal for effectuating movement of the one or more control surfaces. In one embodiment, the movement of the one or more control surfaces induces a precession of the selected angular momentum of the gyroscopic stabilization member.

In one embodiment, the fuselage between the two propulsion units provides a space suitable for a payload. In one embodiment, the total thrust provided by the two propulsion devices is substantially greater than a thrust from a single propulsion device that is substantially similar to each of the two propulsion devices, such that use of two propulsion devices and the fuselage allows for improved payload of the aircraft.

Yet another embodiment of the present disclosure relates to an aircraft that includes a fuselage having a longitudinal axis, and two propulsion devices coupled to the fuselage. Each propulsion device provides thrust and has one or more control surfaces that direct at least a portion of air flow of the thrust so as to provide flight control of the aircraft. The aircraft further includes a gyroscopic stabilization member coupled to a power source such that the gyroscopic stabilization member rotates about a rotational axis so as to yield a selected angular momentum with respect to the longitudinal axis and a moment of inertia of the aircraft, and thereby provide gyroscopic stabilization of the aircraft during flight.

BRIEF DESCRIPTION OF THE DRAWINGS

FIGS. 17A-17D show various views of one embodiment of the air vehicle in the vertical flight configuration;

These and other aspects, advantages, and novel features of the present teachings will become apparent upon reading the following detailed description and upon reference to the accompanying drawings. In the drawings, similar elements have similar reference numerals.

DETAILED DESCRIPTION OF SOME EMBODIMENTS

Figure 1:
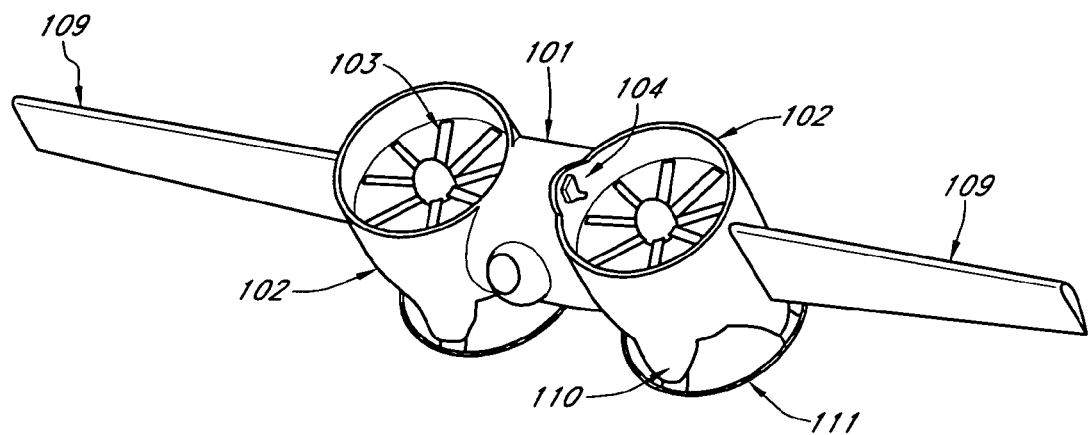
FIG. 1 shows a perspective view of one embodiment of an air vehicle that can be classified as a Class II air vehicle.

The present disclosure generally relates to air vehicles capable of vertical takeoff and landing (VTOL). It will be understood that various features of the present disclosure can also be implemented in other air vehicles such as vertical short takeoff and landing (VSTOL). Thus, although VTOLs are described herein, similar features can also be incorporated into VSTOL and any other air vehicles where stability can be a concern during transition between forward flight and takeoff/landing. It will also be understood that in some embodiments, the air vehicle can be manned; while other embodiments the air vehicle can be an unmanned air vehicle (UAV).

As described herein, various embodiments of the air vehicle includes a fuselage and two or more propulsion units that are spaced laterally from the fuselage. In some embodiments the fuselage houses an engine, and two propulsion units are in the form of shrouded propeller assemblies. Propellers in such shroud assemblies are mechanically coupled to the engine via a power transmission mechanism so as to provide thrust. In such embodiments, the fuselage also houses a gyroscopic stabilization member such as a disk. Such a disk can be spun at a selected rate by, for example, coupling it to the power transmission mechanism.

An air vehicle having such features can provide a number of advantageous performance characteristics. Some non-limiting examples of such advantages are as follows. First, when compared to an aircraft having a single shroud with a given diameter (for example, an aircraft disclosed in U.S. Pat. No. 6,604,706), two shrouds (with each having a similar diameter) can produce significantly greater thrust for various reasons. A static thrust "T" from a shrouded propeller unit can be estimated as $T=(13.13)(M \times P \times D)^{2/3}$, where T is in lb, M is an efficiency factor that takes into account the various effects of viscosity and flow turbulence inside the shroud, P is the engine power in HP, and D is the exit diameter of the exit shroud. Thus, one can see that for a given engine power, the effective exit diameter of two shrouds is greater than one shroud. Moreover, the efficiency M of each of the two shrouds can be significantly greater than that of a single shroud that also encloses an engine. In such single shroud (with engine) configuration, the flow disturbance around the engine, even if streamlined, can be a major factor that decreases the efficiency of thrust generation.

In contrast, various embodiments of the shrouded propeller units of the present disclosures do not have an engine within the shrouds. Thus, thrust-generating efficiency is increased. In one estimation, this increased efficiency (combined with the increased exit diameter) have been shown to increase the static thrust of the two-shroud aircraft by about 70% over a single-shroud (with an engine in the shroud) aircraft having similar sized shroud.

Second, the increased thrust generally allows for greater payload of an aircraft. In various embodiments of the present disclosure, a fuselage is provided between the two shrouds, thereby providing space for such payload. In some embodiments, the payload can be carried within the fuselage.

Third, the fuselage also allows for greater flexibility in the configuration of the gyroscopic stabilization member. As described herein, the angular momentum axis of the gyroscopic stabilization member can be directed in different directions (for example, parallel or perpendicular to the longitudinal axis of the fuselage). Such differences in the orientation of the disks can provide flexibility in configuration of flight controls.

Fourth, as described herein, use of two spaced thrust units (e.g., two shrouded propeller units) also allows for additional flexibility in flight control that is not present in a single-thrust aircraft. For example, one side of the aircraft can be provided with greater thrust, and such thrust imbalance can be used to induce gyroscopic precession for flight control of the aircraft.

In the description herein, a term "shrouded propeller" is sometimes used interchangeably with a term "shrouded propulsion unit."

Class II or Class II Type Example Embodiment

FIGS. 1 to 6 show one embodiment of an unmanned air vehicle (UAV) that can be designated Class II UAV. The UAV can be gyroscopically stabilized in a manner that will be described in greater detail below. Class II UAV in this embodiment has a shrouded propeller configuration that includes a fuselage 101 and two shrouded propellers 102. In this embodiment the fuselage 101 has an aerodynamic shape and is substantially centrally and solidly mounted between the two shrouded propellers 102. In one embodiment, the fuselage 101 can be generally symmetrical about the air vehicle's longitudinal axis 115 that extends longitudinally so as to coincide with the axis of spin associated with a gyroscopic stabilization (GS) member 107. In one embodiment, the GS member 107 is a disk.

In one embodiment, the shrouded propellers 102 are installed at substantially equal distances from the air vehicle's longitudinal axis 115. The shrouded propellers 102 have longitudinal axes 118 and 119 that can be substantially parallel with the air vehicle's longitudinal axis 115, and located in the substantially same plane created by the air vehicle's longitudinal 115 and pitch 116 (see FIG. 7A) axes. In one embodiment, the propeller shroud can be generally circular and provides an opening in which the propulsion mechanism 103 is mounted. The shroud can be substantially symmetrical about its longitudinal axis 118 (119) that extends through the shroud opening so as to be substantially coincident with the propeller 103 shaft. In this embodiment the propeller 103 can incorporate a plurality of blades that are preferably variable pitch blades such that the pitch of the blades can be changed to alter the propulsion force provided by the propeller 103. As shown in FIG. 1, the forward edge of the shroud can be generally rounded so as to permit smooth flow into the shroud opening and also over the outer surfaces. The forward edge of the shroud can be designed to significantly increase the propeller thrust.

As is also shown in FIGS. 1 through 6, each shroud can be adapted to have a plurality of landing legs 110 attached to a landing ring 111 so as to enable the air vehicle to land and takeoff in a vertical takeoff and landing (VTOL) profile. In particular, two example landing assemblies, where each assembly includes four landing legs and a ring attached thereto, allow the air vehicle to takeoff from a surface with the plane of propeller 103 being substantially parallel to the plane of the ground and further allowing the air vehicle to land in a similar manner.

As is also shown in FIGS. 1 through 6, the air vehicle can also be equipped with optional wings 109 that can either be fixably mounted to the shroud 102 or can be pivotably mounted in a manner known to the art. The wings 109 can be optional in that they can provide additional flight surfaces to facilitate horizontal flight of the air vehicle. In such horizontal flight, the plane of the propeller 103 can be substantially perpendicular to the plane of the ground. It will, however, be appreciated that in some embodiments, the shroud 102 surfaces can provide sufficient lift to allow for horizontal flight of the air vehicle, and that the wings 109 can thus be optional to provide better flight characteristics for the desired UAV mission.

In one embodiment, the Class II UAV can be specifically configured as a reconnaissance vehicle for use in aerial reconnaissance, such as the type of reconnaissance conducted during military operations. Thus in one embodiment, a rotatable gimbaled camera 114 can be mounted on the bottom outer section of the fuselage 101 in a manner shown in FIGS. 1 through 6. The camera 114 can be one of a number of well known reconnaissance cameras that can be controllable by the flight control system or a remote operator in a manner that is generally known in the art.

Class III or Class II Type Example Embodiment

In some embodiments, gyro stabilization can be implemented in air vehicles that can be classified as Class III VTOL UAV. In one embodiment, gyro stabilization can be provided by a rotating disk. Three non-limiting example embodiments of Class III UAVs are described.

The following description can be common to the three example embodiments. FIGS. 10, 11, 17, and 18 show one embodiment of an unmanned air vehicle (UAV) designated Class III UAV that can be configured to be gyroscopically stabilized in a manner that will be described in greater detail below. Class III UAV in this example embodiment has a shrouded propeller configuration having a fuselage 201 and the two shrouded propellers 202. In this embodiment, the fuselage 201 has an aerodynamic shape and is centrally mounted between the two shrouded propellers 202. The shrouded propellers 202 can tilt about the fuselage 201 from a vertical position for vertical flight to a horizontal position for forward flight. The fuselage 201 can be generally symmetrical about the air vehicle's longitudinal axis 217 (see FIG. 13, for example) that extends longitudinally. In one embodiment, the longitudinal axis 217 of the air vehicle is substantially perpendicular to the axis of spin of a GS member 225 (see FIG. 13).

Figure 10:
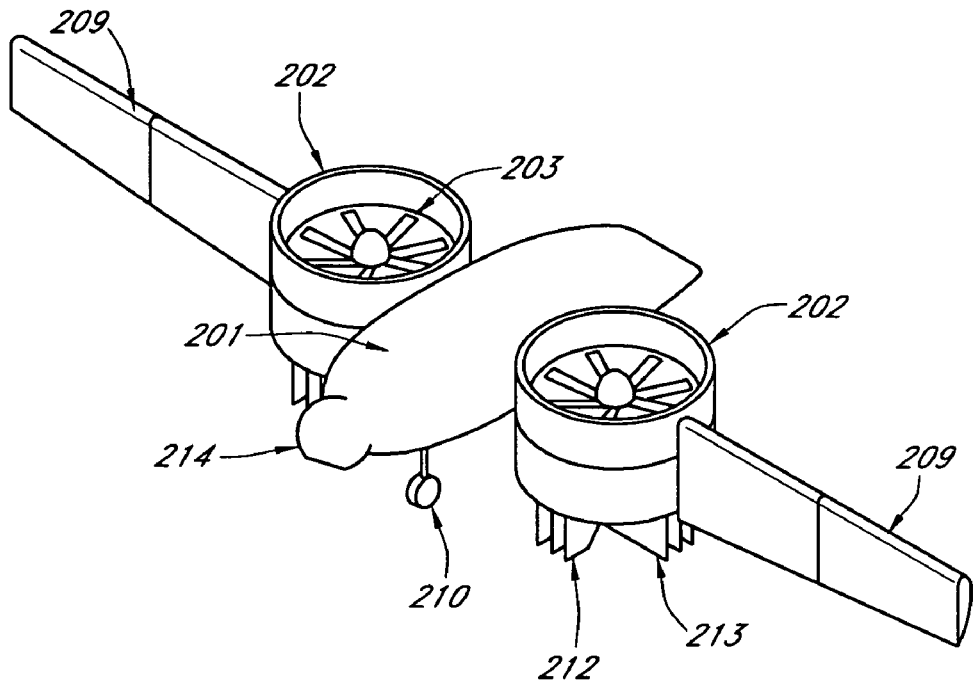
FIG. 10 shows a perspective view of one embodiment of an air vehicle that can be classified as a Class III air vehicle, where the air vehicle is configured for vertical takeoff and landing.
Figure 11:
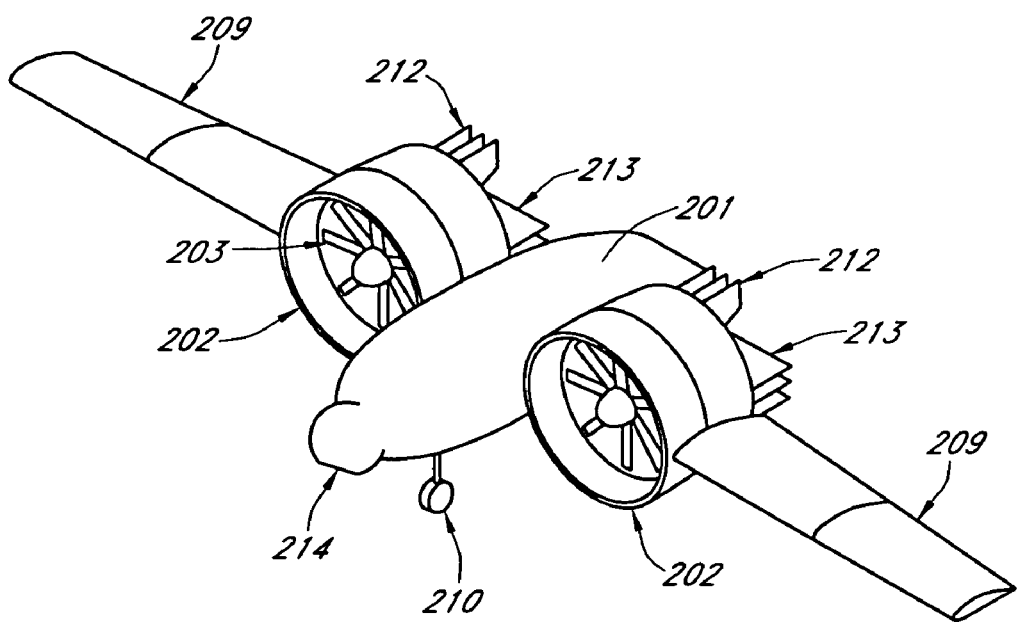
FIG. 11 shows a perspective view of the air vehicle of FIG. 10, where the air vehicle is configured for forward flight.

In one embodiment, the shrouded propellers 202 are installed at substantially equal distances from the air vehicle's longitudinal axis 217 and yaw axis 219. The shrouded propellers longitudinal axes 220 and 221 are substantially parallel with the plane created by the air vehicle's longitudinal axis 217 and yaw axis 219 (see FIG. 19C). In this embodiment the propeller shroud is generally circular and provides an opening in which the propulsion mechanism 203 is mounted. The shroud is substantially symmetrical about its longitudinal axis 220 (221) that extends through the shroud opening so as to be substantially coincident with the propeller shaft. In this example embodiment, the propeller 203 incorporates a plurality of blades that are preferably variable pitch blades such that the pitch of the blades can be changed to alter the propulsion force provided by the propeller 203. As shown in FIGS. 10 and 11, the forward edge of the shroud can be generally rounded so as to permit smooth flow into the shroud opening and also over the outer surfaces. The forward edge of the shroud can be designed to significantly increase the propeller thrust.

As shown in FIGS. 10 to 16, the fuselage 201 can be configured to have an example tricycle landing gear 210 and 211 so as to enable the Class III UAV to land and takeoff in a vertical takeoff and landing (VTOL) profile, short takeoff and landing (STOL) profile or conventional takeoff and landing (CTOL) profile. In all these landing modes the fuselage can generally maintain a horizontal orientation. The shrouded propellers 202 can tilt about the fuselage 201. For VTOL profile the air vehicle can takeoff from a surface with the plane of propeller 203 being substantially parallel to the plane of the ground and further allowing the UAV to land in a similar manner. During a STOL profile the plane of propeller is at a high angle of attack (in one embodiment, approximately 75 to 80 degrees) to the plane of the ground for takeoff and landing. For a CTOL profile the air vehicle can takeoff from a surface with the plane of propeller 203 being substantially perpendicular to the plane of the ground and further allowing the UAV to land in a similar manner.

As is also shown in FIGS. 10 to 18, the Class III UAV can also be equipped with optional wings 209 that can either be fixably mounted to the shroud 202 or be pivotably mounted in a manner known to the art. The wings 209 can be optional in that they can provide additional flight surfaces to facilitate horizontal flight of the Class III UAV. It will, however, be appreciated that, by the following description, the shroud 202 surfaces can provide sufficient lift to allow for horizontal flight of the Class III UAV and that the wings 209 can thus be optional to provide better flight characteristics for the desired UAV mission.

Three non-limiting example embodiments of the Class III UAV are now described.

Class III-A Example Embodiment

Figure 12:
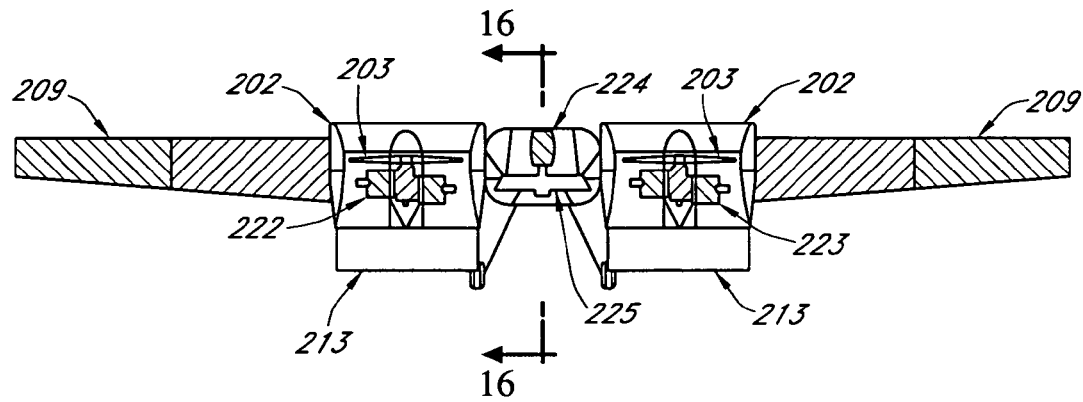
FIG. 12 shows a front view of one embodiment of the air vehicle of FIG. 11.
Figure 13:
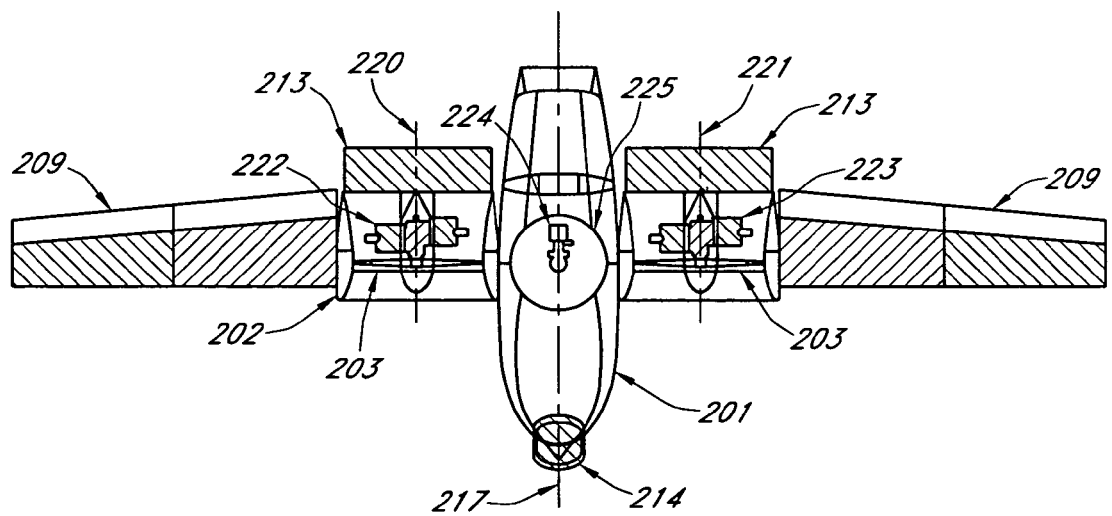
FIG. 13 shows a top view of one embodiment of the air vehicle of FIG. 10.

One embodiment of a Class III-A UAV, as shown in FIGS. 12 and 13, includes one 222 (223) engine installed in each of the shrouded propellers 202. The engine shaft axis substantially coincides with the shrouded propeller axis 220 (221). The GS disk 225 is depicted as being actuated by a third engine 224 via a gear box 205 (see FIG. 16).

Class III-B Example Embodiment

Figure 14:
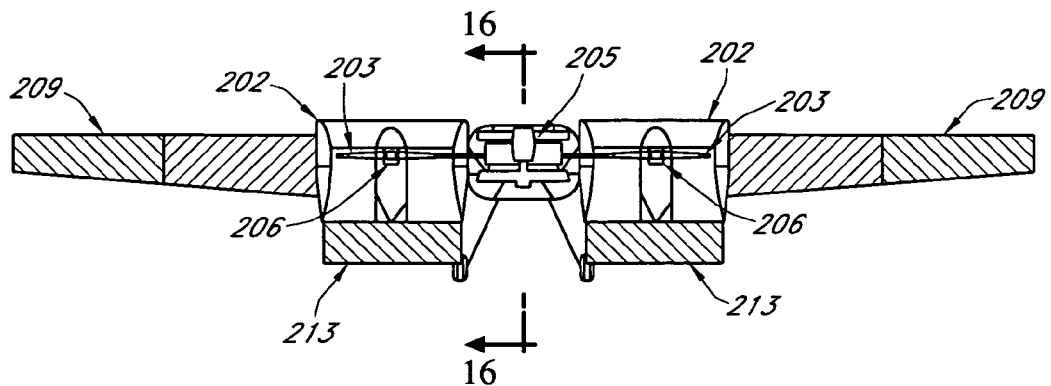
FIG. 14 shows a front view of another embodiment of the air vehicle of FIG. 11.
Figure 15:
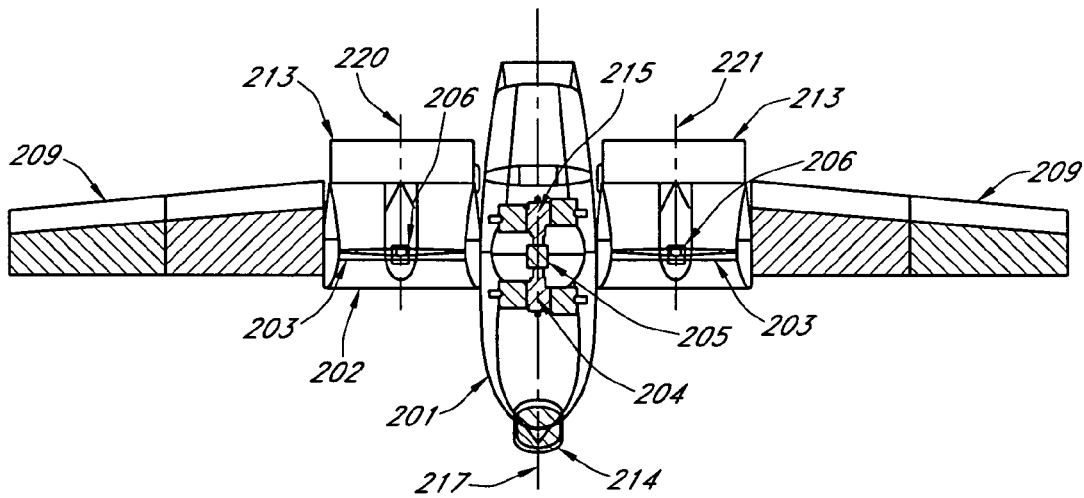
FIG. 15 shows a top view of another embodiment of the air vehicle of FIG. 10.
Figure 16:
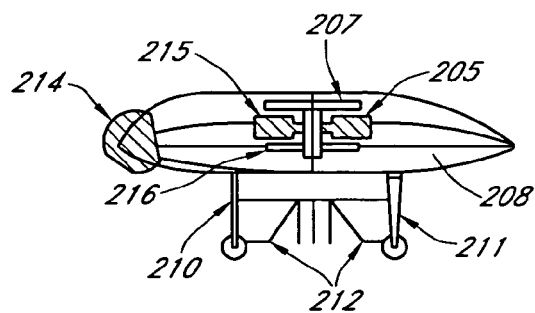
FIG. 16 shows a sectional side view of the air vehicle of FIG. 12 or 14.
Figure 18D:
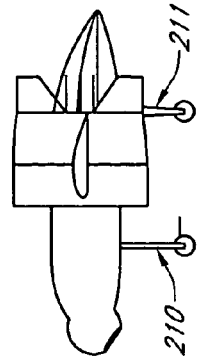
FIGS. 18A-18D show various views of one embodiment of the air vehicle in the forward flight configuration.
Figure 18C:
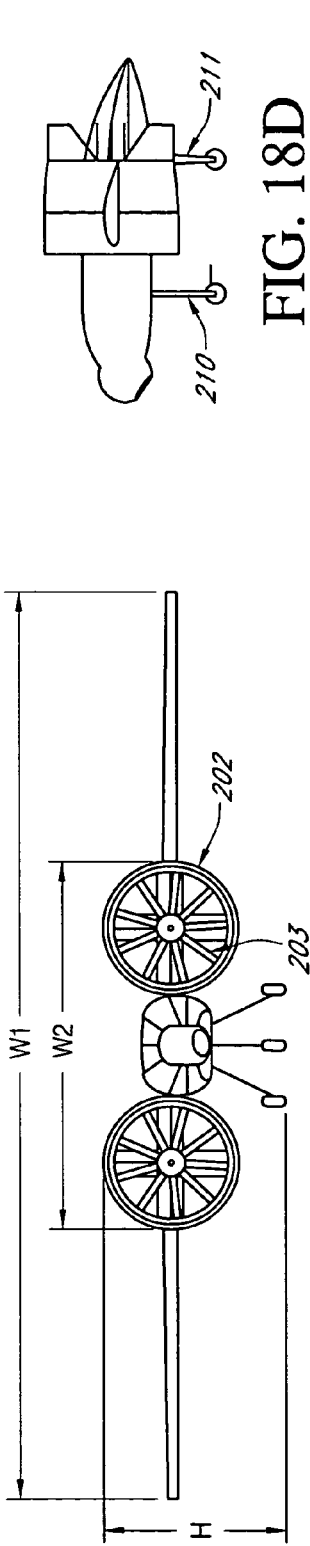
Figure 18A:
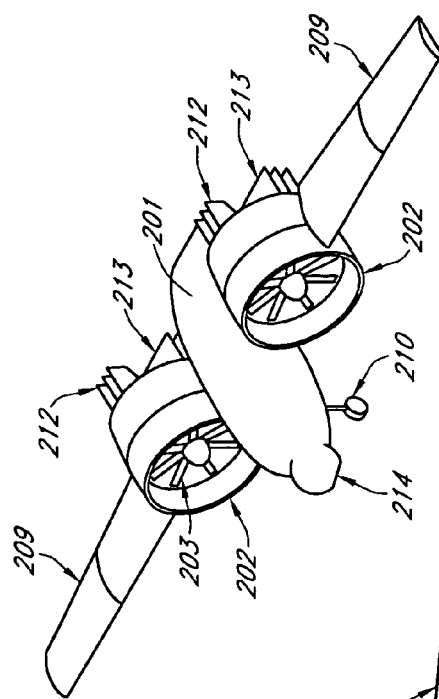
Figure 18B:
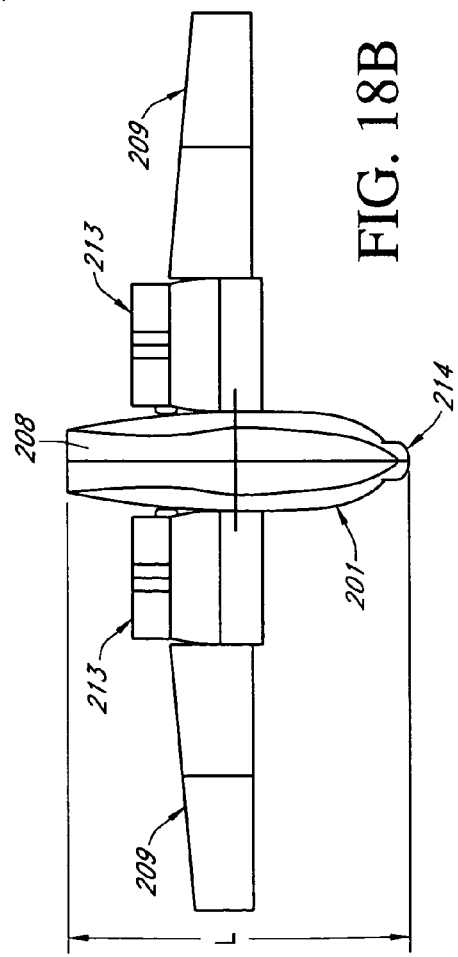

One embodiment of a Class III-B, as shown in FIGS. 14-16, includes two engines 204 and 215 installed in the fuselage 201. The GS disk includes two disks 207 and 216. In one embodiment, the disks 207 and 216 can rotate at a substantially same angular velocity and in the same direction. Engines 204 and 215 can actuate the shrouded propellers 203 and the GS disks 207 and 216 via gear boxes 205 and 206. During vertical takeoff and landing both engines 204 and 215 can provide power to the propellers 203 and the GS disks 207, 216. In forward flight the power requirements can be considerably lower, and accordingly, one of the engines can be stopped.

Class III-C Example Embodiment

One embodiment of a Class III-C can be similar to Class III-B except that the air vehicle has only one engine installed in the fuselage and one GS disk.

Control System and Stabilization

As is shown in FIGS. 1-6 and 11-18, at the rear of each shrouded propeller there can be installed two sets of control surfaces, 112 and 113 for Class II and 212 and 213 for Class III air vehicle. Preferably there are two or more control surfaces in each set. The control surfaces are pivotally mounted and are controlled by a flight control system such that by pivoting the control surfaces 112 and 113 (212 and 213) of either or both shrouds the flight operation of the air vehicles can be controlled about the pitch, yaw and roll axes. Examples of operations of the control surfaces 112 and 113 are described in greater detail below for Class II and Class III air vehicles.

As discussed above, various embodiments of the UAV incorporates a gyroscopic stabilization (GS) disk 107 (207) that provides gyroscopic stabilization of the UAV. As it will be described in greater detail below, the gyroscopic stabilization disk 107 (207) gyroscopically stabilizes the air vehicle such that an external or internal force on the air vehicle results in the air vehicle experiencing gyroscopic precession motion. Gyroscopic precession is manifested ahead approximately 90 degrees in the direction of rotation of the gyro stabilizing disk 107 (207). In other words, the air vehicle is stabilized by the disk 107 (207) such that when an external torque (having a component perpendicular to the axis of rotation) acts upon the air vehicle, this results in a change in the direction of the angular momentum of the UAV. Due to the gyroscopic stabilization disk 107 (207), the external torque is manifested as a change in the direction of the angular momentum of the disk 107 (207). This results in the axis about which the disk 107 (207) is rotating (in this case the axis 115 (219) precessing or changing its orientation.

The angular momentum of the gyroscopic member 107 (207) can depend on factors such as the weight of the disk 107 (207), the weight distribution, and also the rate at which it is rotated. In some embodiments, the weight distribution of the disk 107 (207) is selected so that the weight is concentrated at the outer perimeter so as to increase the moment of inertia of the disk (and thus the angular momentum of the disk at a given rotational rate). In one embodiment, as it will be described in greater detail below, the angular momentum of the disk 107 (207) is significantly greater than the moment of inertia of the rest of the air vehicle about the axis of the disk rotation 115 (219) so that the air vehicle is gyroscopically stabilized. As it will be apparent, the weight of the components comprising the air vehicle are preferably positioned such that the center of gravity and the aerodynamic center of the air vehicle are substantially coincident with the center of rotation of the disk such that the stability of the air vehicle is enhanced.

In some embodiments, an electrical starter and an electrical generator could be attached to the air vehicle engine 104 (204) such that the electrical starter can start the engine from a remote command and the electrical generator can produce electrical power for the electrical system of the air vehicle. As discussed above, the propellers 103 (203) are preferably variable pitch propellers and a variable pitch mechanism of a type known in the art is used to control the pitch of the propellers so as to control the thrust produced by the aircraft and, consequently, the speed of operation of the air vehicle.

By gyroscopically stabilizing the UAV, internal and external torque(s) exerted upon the air vehicle during flight can result in the precession of the air vehicle. Moreover, the gyroscopic stabilization of the air vehicle results in a slower rate of change in the orientation of the air vehicle in response to changes in internal and external torque(s), such as changing due to fuel consumption, change in propeller pitch, wind and other disruptive forces. This decrease in the rate of change of the orientation of the air vehicle gives ample time to flight control system and/or the pilot to respond and control the air vehicle.

In particular, it will be appreciated that the gyroscopic disk enables the attitude or orientation of the air vehicle to be changed in a predictable manner. In particular, since the angular momentum of the gyroscopic disk is relatively large when compared with the rotational inertia of the air vehicle along an axis perpendicular to the rotational axis of the gyroscopic disk as it will be described in greater detail below, the rotational dynamics of the air vehicle are substantially influenced by the rotational dynamics of the gyroscopic disk. Specifically, instead of changing the magnitude of the angular momentum of the air vehicle an external torque acting on the air vehicle which is substantially perpendicular to the rotational axis of the gyroscopic disk induces the angular momentum of the gyroscopic disk to change direction. Thus, when the air vehicle is exposed to such external torque(s), the air vehicle will tend to rotate in a manner that eventually results in a substantially slow precession of the gyroscopic disk. Furthermore, since the rotational axis of the gyroscopic disk changes in the direction of the applied torque, the gyroscopic disk can be induced into precession within a first plane simple by exposing the air vehicle to at least one external force which is substantially perpendicular to the first plane as it will be describe in greater detail below.

It will also be appreciated that the relatively large angular momentum of the gyroscopic disk provides the air vehicle with improved stability. Furthermore, since the rate of precession of any spinning object is inversely proportional to the magnitude of its angular momentum, the relatively large angular momentum of the gyroscopic disk ensures that the air vehicle will most likely experience a relatively small rotational velocity.

Thus, when an uncontrollable external torque is applied onto the air vehicle, such as that caused by turbulent airflow over the exposed surfaces of the air vehicle, the air vehicle can react in a relatively slow manner. Consequently, since such torques are usually exerted over short periods of time, the air vehicle is less likely to experience a change in attitude that is beyond an uncorrectable threshold level. Moreover, since the average value of such torques over extended periods of time is substantially small, less attitude adjustment is demanded of the control system. Furthermore, since the control system is provided a relatively large reaction time period, the control system is better able to provide attitude correction so that the attitude of the air vehicle is more likely to remain within an acceptable range so as to reduce the likelihood that the air vehicle will likely undergo uncontrollable rolling motion along either of its gyro stabilized axes.

In some embodiments, the UAV can incorporate a control system that is configured to control the air vehicle during flight. In one embodiment, the control system can include an on-board computer that maintains the UAV desired orientation and heading in accordance with a programmed flight path and it will also be responsive to external commands from a remote location so as to change the orientation and heading of the aircraft. Further, since the UAVs are usually adapted to provide reconnaissance, the control system can also be configured to accommodate equipments such as the video/IR sensor 114 (214) in order to obtain reconnaissance data.

In one embodiment, the UAV control system can be in communication with a ground control station (GCS) and include a data link for the reconnaissance signal and telemetry signals. Thus, the flight control system can include a flight controller which is receiving information from onboard sensors indicating the current orientation and flight characteristics of the UAV. The control system can be further capable of receiving and sending information to the GCS via telemetry system. The flight controller receives heading information from the GCS, but has onboard control suitable for maintaining a desired orientation or attitude of the aircraft. The flight controller can be capable of sending output signals to control surface actuators and the propulsion control actuators. The flight controller is also capable of receiving and sending output signals to control the reconnaissance sensor orientation. It is contemplated that the aircraft can be operated in either an auto pilot mode or in a manual mode.

As discussed above, the UAV can include four sets of control surfaces 112, 113 (212, 213) capable of controlling the orientation of the aircraft about the yaw, pitch and roll axes. Moreover, the propulsion unit can be controlled either by increasing the speed of operation of the engine 104 (204) or, in the embodiments where the speed of operation of the engine is fixed, by varying the pitch angle of the propellers 103 (203) to increase or decrease the degree of thrust produced by each individual propeller of the vehicle. Each variable pitch propeller 103 (203) can be controlled independently.

In some embodiments, effectuating the foregoing actuations of the control surfaces and/or the propeller pitch can be achieved in a known manner. In some embodiments, the flight controller can be programmed to sense when the orientation of the aircraft about the pitch roll or yaw axes has moved from a desired orientation as a result of either internal or external forces acting upon the air vehicle. Due to the fact that the air vehicle is gyroscopically stabilized, the speed at which an internal or external force will create a substantial change in the heading of the aircraft is slowed down by the considerably higher value of the disk angular momentum when compared to the air vehicle moments of inertia. The flight control system thus can have considerably more time to take corrective action to maintain the desired orientation of the aircraft. Thus, the aircraft is more stable in operation and the necessity of applying sudden corrections and sudden movements of the control surfaces can be reduced as the rate of change of orientation of the aircraft as a result of external forces is decreased.

FIGS. 7A-7D show examples of the positioning of the control surfaces 112 and 113 (FIGS. 19A-19H for 212 and 213) in order to effectuate movement about the three axes of the aircraft. In particular, it should be appreciated that, due to the precession of the aircraft as a result of the gyroscopic stabilization, an external or internal force applied to the aircraft, such as the force resulting from changing the profile of the flight control surfaces 112 and 113 (212 and 213) and the thrust exhaust of the variable pitch propellers 103 (203) is manifested ahead approximately 90 degrees in the direction of rotation. Thus, the orientation of the control surfaces 112 and 113 (212 and 213) can be similarly adjusted to achieve a desired movement about the pitch and yaw axes. Hence, the control system can be configured such that a change in a desired direction takes into account the gyroscopic stabilization and the resulting precession of the aircraft.

In some embodiments, there can be significant differences between the Class II UAV flight control system and Class III UAV flight control systems and as result, examples of their operations are described separately.

Control System Operation for Class II or Class II Type Air Vehicle

Figure 2:
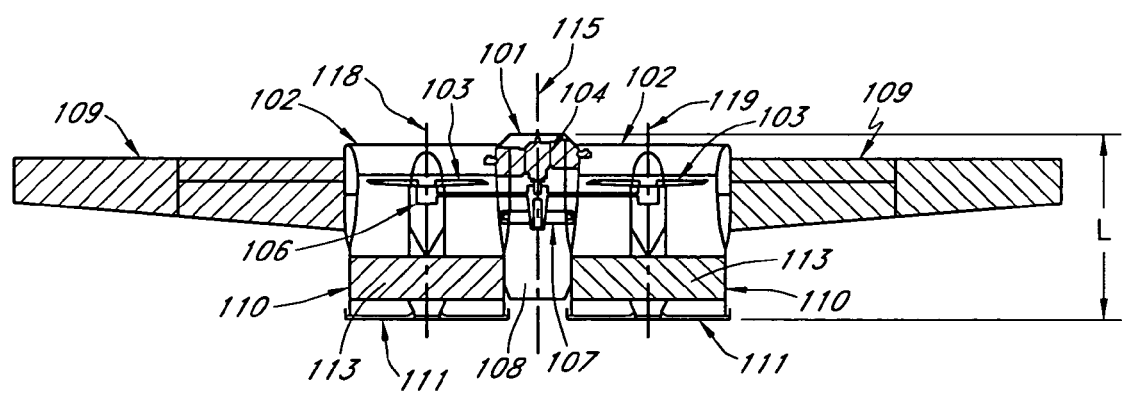
FIG. 2 shows a cross-sectional view of the air vehicle of FIG. 1.
Figure 3:
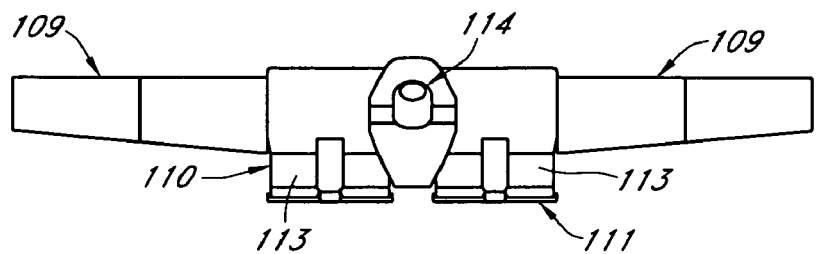
FIG. 3 shows a bottom view of the air vehicle of FIG. 1.
Figure 4:
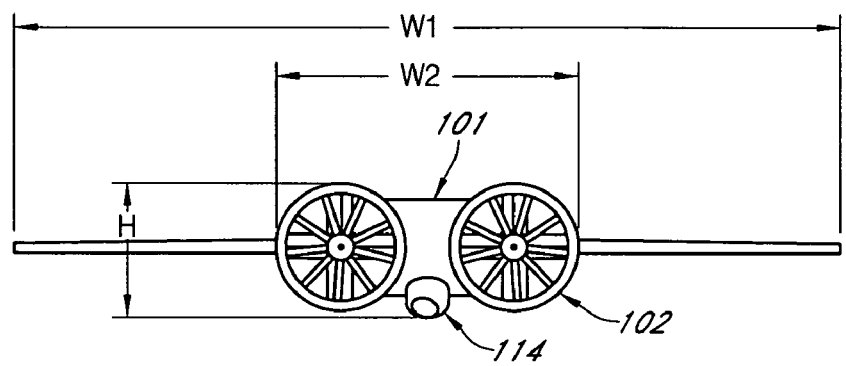
FIG. 4 shows a front view of the air vehicle of FIG. 1.
Figure 5:
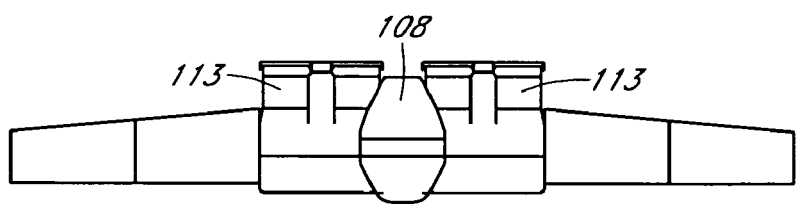
FIG. 5 shows a top view of the air vehicle of FIG. 1.
Figure 6:
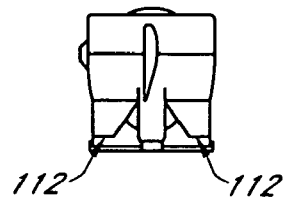
FIG. 6 shows a side view of the air vehicle of FIG. 1.

For Class II UAV or similar vehicles, control surfaces can maintain their function substantially throughout the flight envelope. In one embodiment where the gyroscopic spin axis is generally coaxial with the longitudinal axis of the air vehicle, the air vehicle can be gyro stabilized in yaw and pitch. In one embodiment, as shown in FIGS. 2 and 6 (for example), the air vehicle can include control surfaces 112 and 113 that can provide various attitude of the air vehicle relative to various axes. Examples of such controls are now described in reference to FIGS. 7A-7D.

Figure 7A:
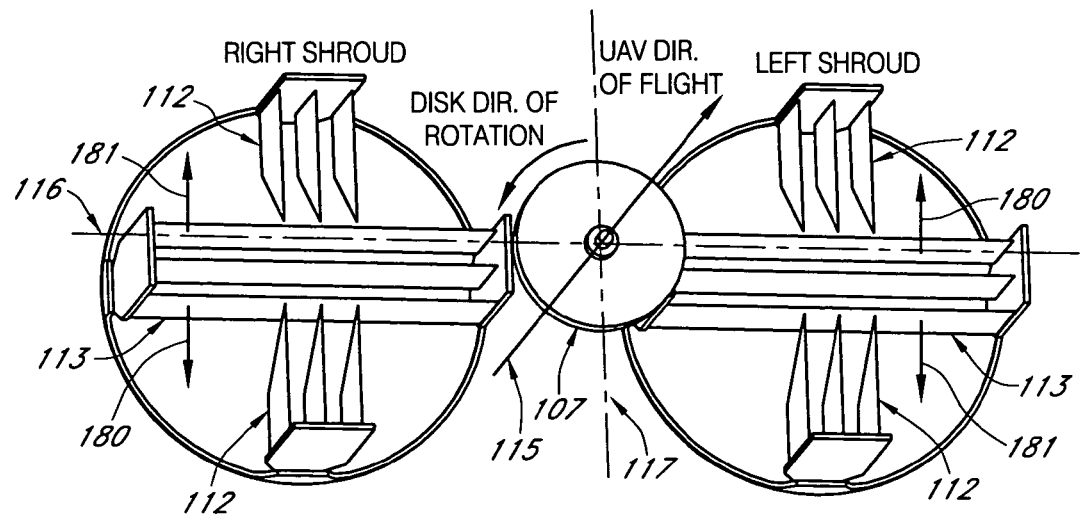
FIGS. 7A-7D show one embodiment of control surfaces that can provide pitch, yaw, and roll controls for the air vehicle of FIG. 1.

FIG. 7A shows an example where the orientations of the control surfaces 112 and 113 for the left and right shrouded propellers can change in order to effectuate the stability of the air vehicle about the roll axis which, in one embodiment, is substantially coincident with the longitudinal axis 115 of the fuselage 101. In order to counteract the tendency of the air vehicle to rotate in a counterclockwise direction as a result of the example clockwise rotation (when facing forward) of the GS disk 107, each of the left and right shrouded propeller 113 control surfaces can be pivoted in the directions of the arrows 180 so that a greater surface area is exposed to the thrust from the shrouded propellers 102 so as to counteract the tendency of the fuselage 101 (see FIGS. 1 to 6) to rotate in the counterclockwise direction in response to the clockwise torque of the GS disk 107. It will he appreciated that increasing the angle of the left and right control surfaces 113 in the direction of the arrows 180 can result in a roll motion of the air vehicle in the clockwise direction. Similarly, having the left and right control surfaces 113 to be pivoted in the opposite direction, i.e. in the direction of the arrows 181, can result in the air vehicle to roll in a counterclockwise direction.

Figure 7B:
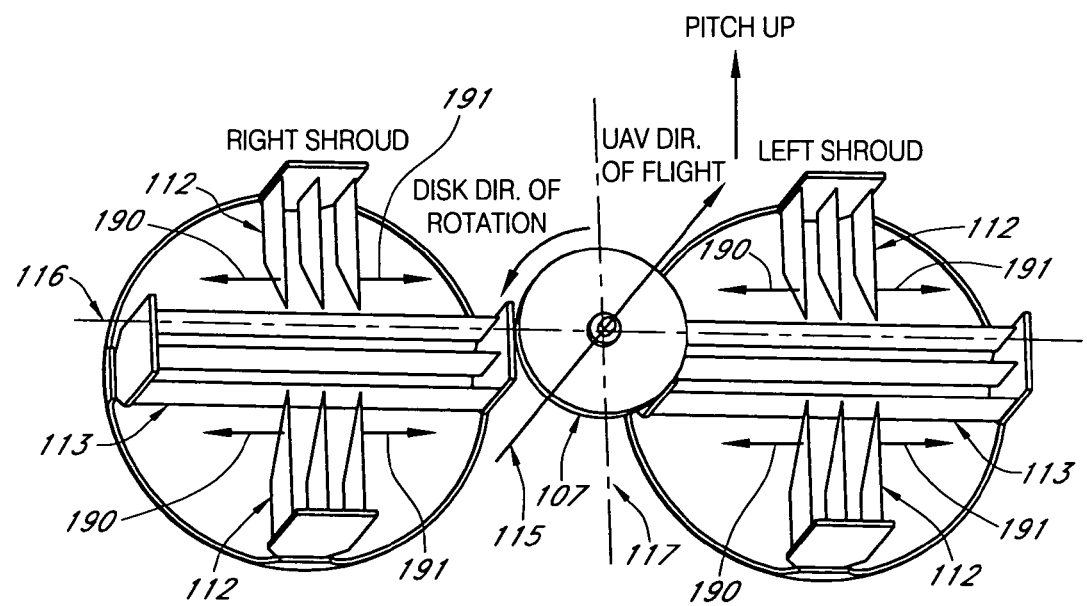

FIG. 7B shows an example of the orientation of the left and right control surfaces 112 to effectuate the pitch of the air vehicle. Pitch is the longitudinal change of the air vehicle about the pitch axis 116 that is perpendicular to the longitudinal axis 115 and yaw axis 117. In effect, the forward edge of the fuselage is moving either up or down with respect to the rear edge. Due to the gyroscopic precession, the left and right control surfaces 112, i.e. the vertical control surfaces in this particular example orientation of the aircraft, can be both moved either left or right in order to effectuate a change in pitch of the aircraft. In particular, moving the control surfaces 112 in a direction 190 such that a larger surface area of the control surfaces 112 are exposed to the thrust emanating from the left and right propellers 103 which thereby imparts a force on the rear of the aircraft which, in the absence of precession, would result in the aircraft yawing from left to right. However, due to the precession of the aircraft, this results in the forward edge of the fuselage 101 moving up with respect to the rear edge. Similarly, moving the left and right control surfaces 112 in the direction 191 can result in the forward edge of the fuselage 101 dipping downward with respect to the rear edge.

Figure 7C:
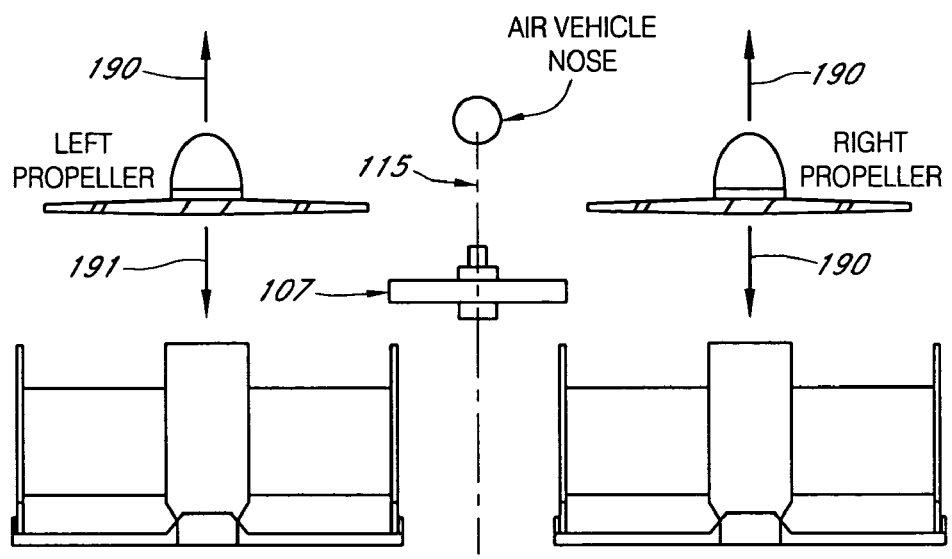

Another way of controlling the air vehicle pitch, as shown in FIG. 7C, is by adjusting the left or right shrouded propeller 103 blade angle of attack. By reducing or increasing blades angle of attack the shrouded propeller thrust is reduced or increased accordingly. When the left shrouded propeller thrust is reduced and the right shrouded propeller thrust is maintained substantially constant or increased the fuselage nose can pitch down. Similarly, when the left shrouded propeller thrust is increased and the right propeller thrust is reduced or maintained substantially constant the nose can pitch up.

Figure 7D:
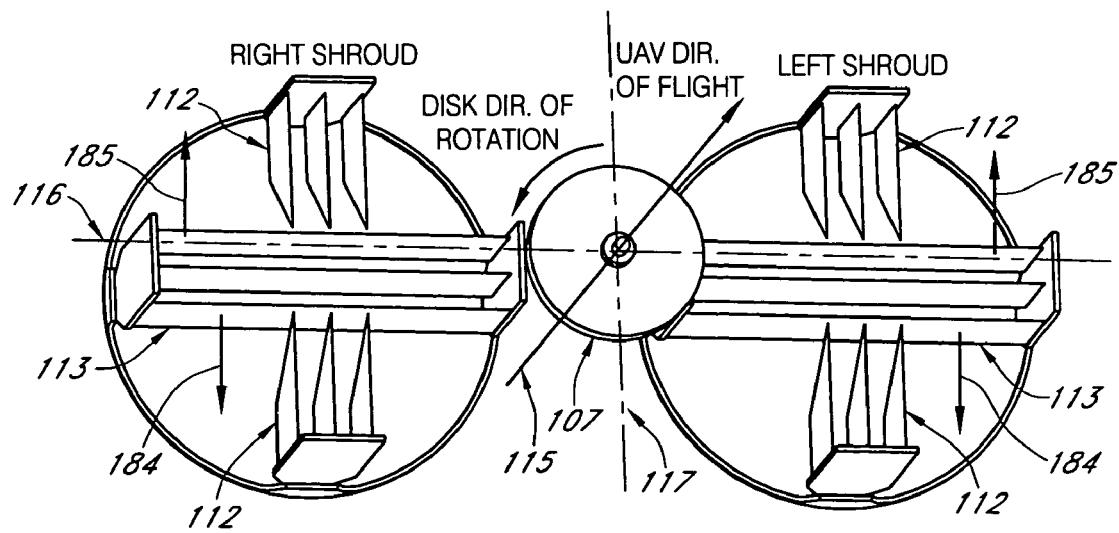

Lastly, FIG. 7D shows an example of the orientation of the left and right control surfaces 113 that can effectuate a yaw, i.e. a change in orientation about the yaw axis 117 which is substantially perpendicular to the longitudinal axis 115 and pitch axis 116. In particular, in order to induce a yaw from left to right, both left and right control surfaces 113 can be moved in the direction 184 so that a greater surface area of the control surface is exposed to the thrust in the direction of the arrows 184 so as to exert a downward force in the rear of the air vehicle. Similarly, to get the air vehicle to yaw from right to left, both left and right control surfaces 113 can be moved in the opposite direction, i.e. in the direction of the arrows 185.

Thus as describe above by way of examples, the stability of the air vehicle can enhanced by having a gyroscopic stabilization member that translates any force exerted against the air vehicle into a gyroscopic precession, i.e. a change in the angular orientation of the air vehicle. The relatively slow rate of change in the orientation of the air vehicle can allow for greater stability which thereby allows the air vehicle to more successfully transition between vertical flight and substantially horizontal flight.

Figure 8A:
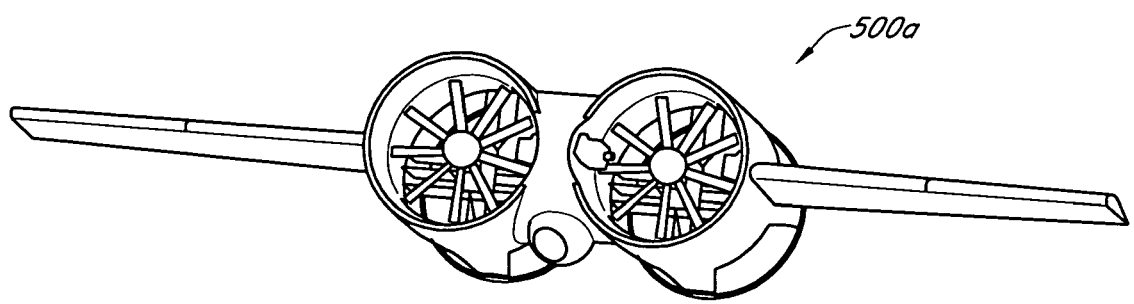
FIGS. 8A-8C show an example transition between forward flight and vertical takeoff and landing for one embodiment of the air vehicle.
Figure 8B:
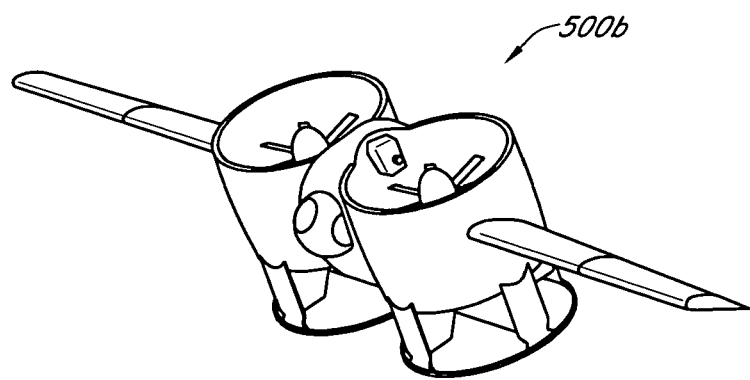
Figure 8C:
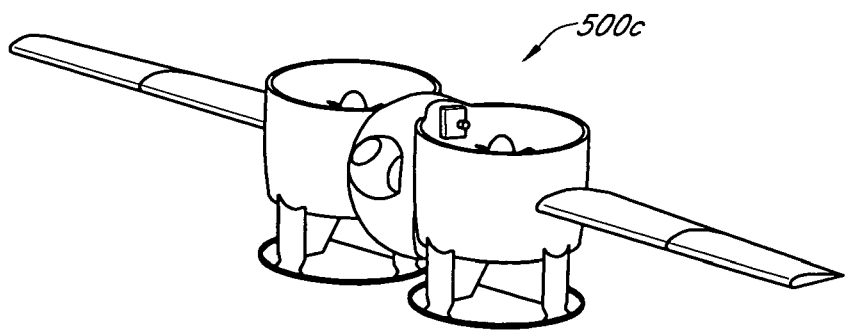

In one embodiment, a Class II UAV is designed to take off and land in a generally vertical orientation off of the landing gear comprised of the landing legs 110 and landing ring 111. After leaving the ground (as depicted in FIG. 8C), the air vehicle can tilt forward (as depicted in FIG. 8B) in a particular direction. In one example, the forward tilt of the longitudinal axis 115 is approximately 10 to 15 degrees from a perpendicular axis. As the air vehicle gains forward speed the shrouded propellers can tilt forward to a forward flight angle of attack of approximately 8-10 degrees or as required by the flight mission (as depicted in FIG. 8A).

Figure 9A:
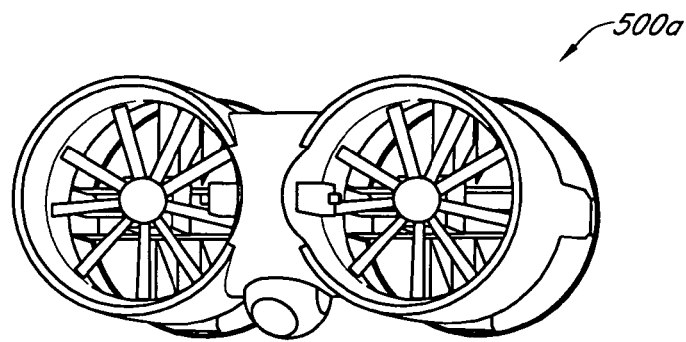
FIGS. 9A-9C show an example transition between forward flight and vertical takeoff and landing for another embodiment of the air vehicle.
Figure 9B:
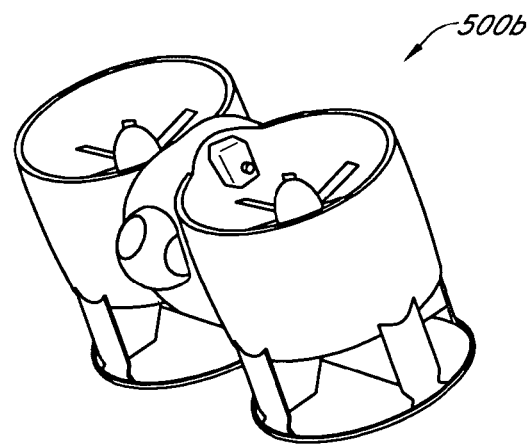
Figure 9C:
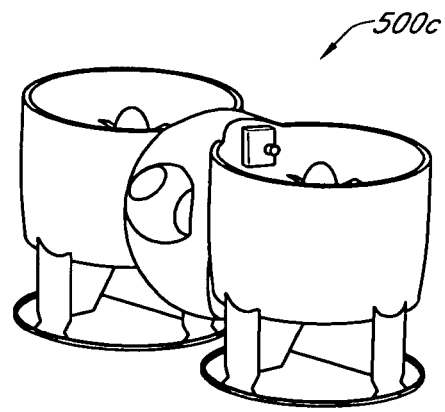

As described herein some embodiments of the Class II UAV can have wings, while some do not. For example, the air vehicle depicted in FIGS. 8A-8C includes wings. FIGS. 9A-9C show a Class II UAV without wings in a transition from a vertical takeoff to a horizontal flight, in a manner generally similar to that shown in FIGS. 8A-8C.

Control System Operation for Class III or Class III Type Air Vehicle

In some embodiments, Class III UAV control surfaces can change their function from vertical flight to horizontal flight. The air vehicle can be gyro stabilized in roll and pitch.

Figure 19A:
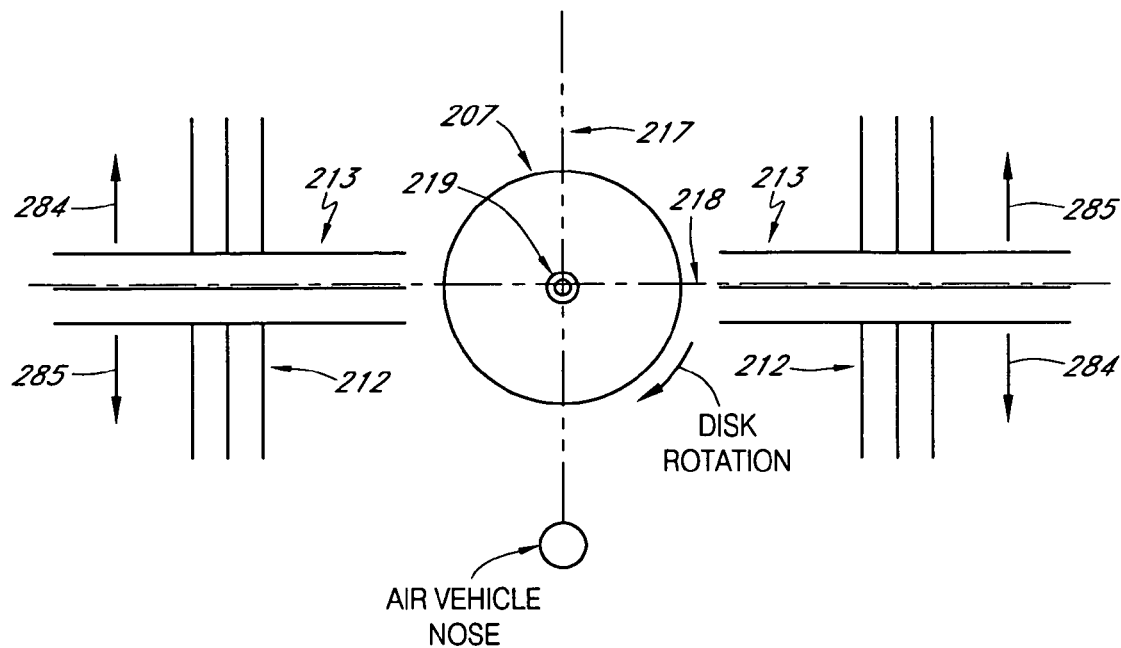
FIGS. 19A-19D show one embodiment of control surfaces that can provide pitch, yaw, and roll controls for the air vehicle in the vertical flight configuration.

FIG. 19A shows the direction at which the control surfaces 212 and 213 for the left and right shrouded propellers can change in order to effectuate the stability of aircraft about the aircraft yaw axis 219 (in and out of page in FIG. 19A) which can be substantially coincident with the GS disk 207 spin axis in vertical flight and in forward flight. In order to counteract the tendency of the aircraft to rotate in a counterclockwise direction as a result of the example clockwise (when viewed from the top) rotation of the GS disk 207, in vertical flight each of the left and right shrouded propeller control surfaces 213 can be pivoted in the directions of the arrows 284.

Figure 19B:
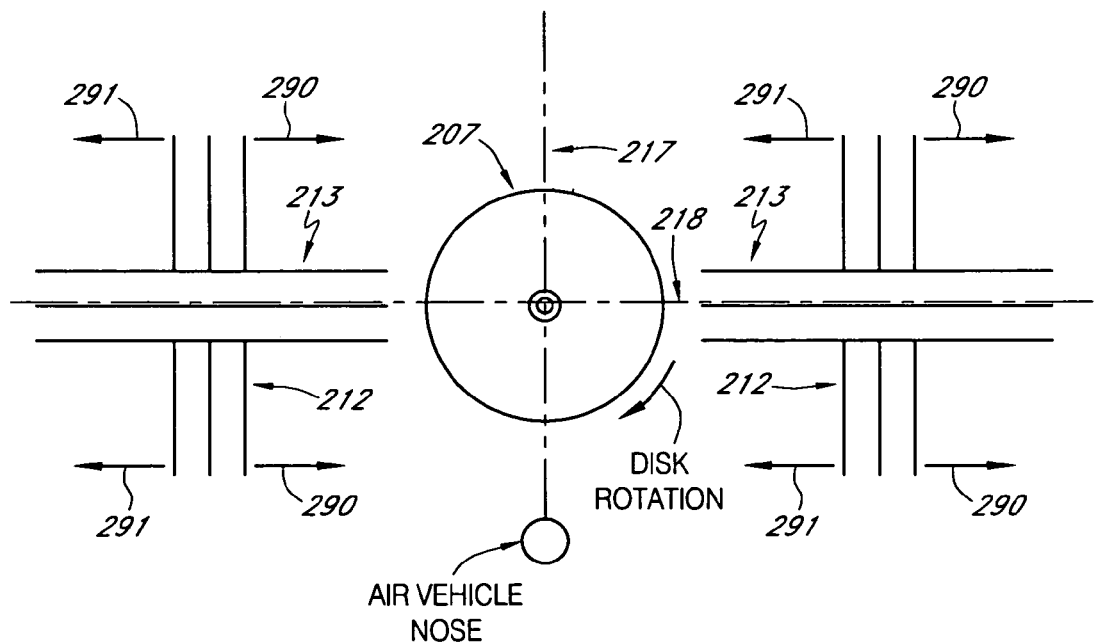
Figure 19C:
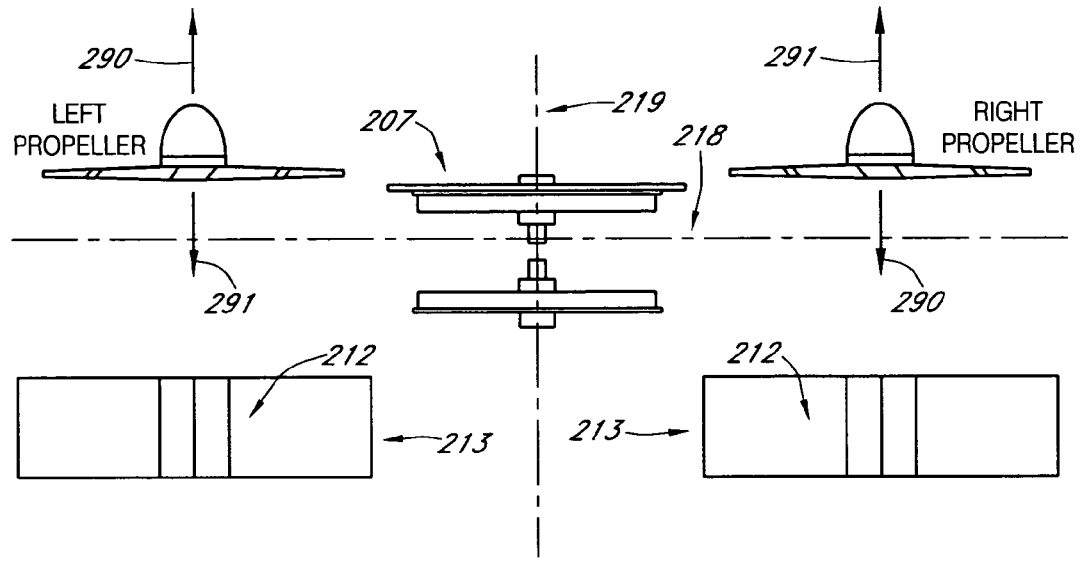
Figure 19D:
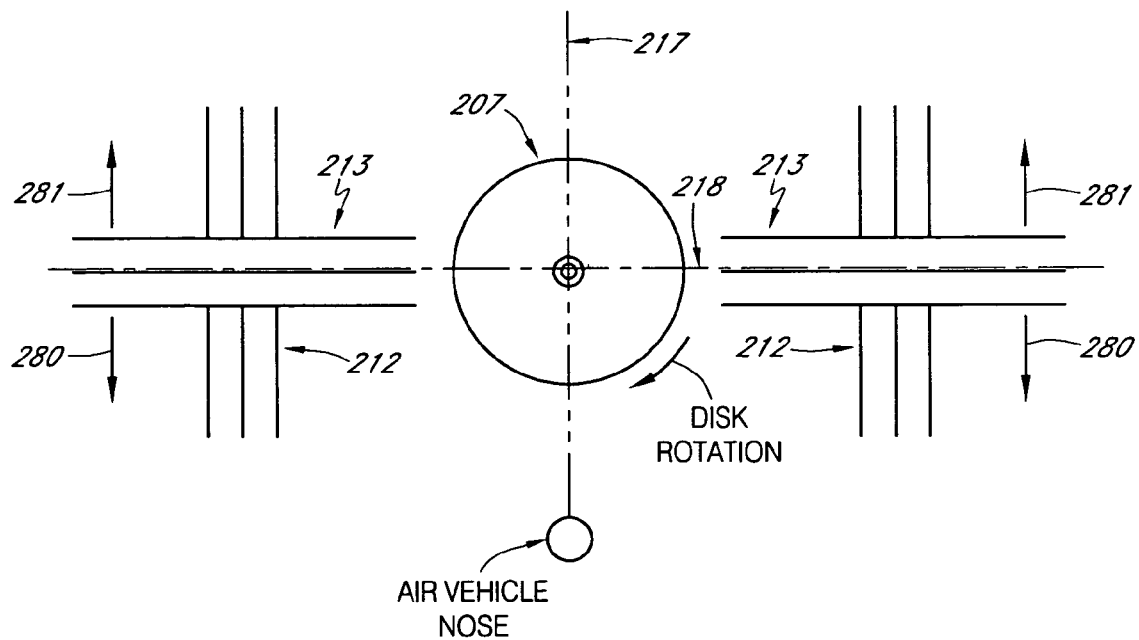
Figure 19E:
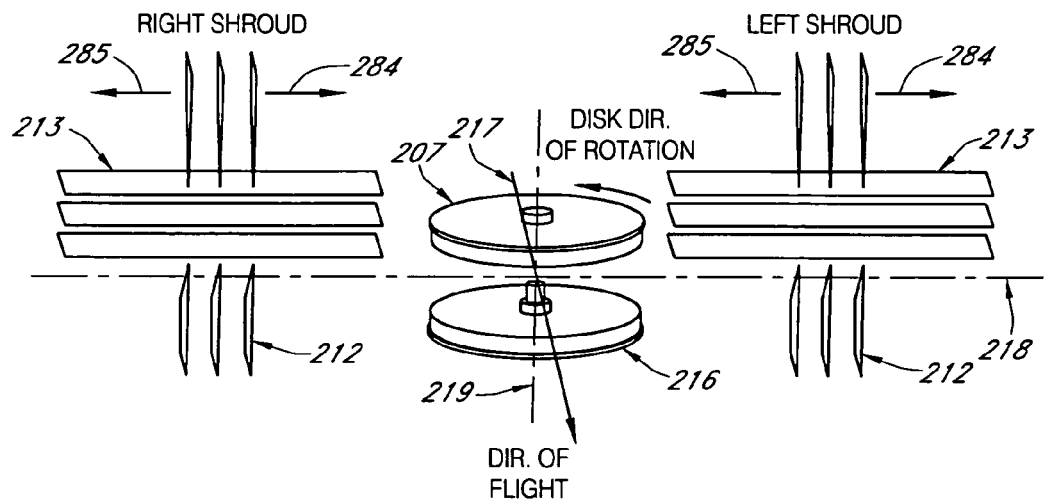
FIGS. 19E-19H show one embodiment of control surfaces that can provide pitch, yaw, and roll controls for the air vehicle in the forward flight configuration.

During forward flight, as shown in FIG. 19E, the tendency of the aircraft to rotate counterclockwise in response to the clockwise torque of the GS disk 207, is taken over by the left and right 212 control surfaces which can be pivoted in the direction of the arrows 284.

It will be appreciated that increasing the angle of the left and right control surfaces 213 in the direction of the arrows 284 for vertical flight and of the left and right 212 control surfaces in forward flight can result in a yaw right motion of the air vehicle. Similarly, having the left and right control surfaces 213 to be pivoted in the opposite direction for vertical flight and left and right control surfaces 212 for forward flight, i.e. in the direction of the arrows 285, can result in the air vehicle to yaw left.

Figure 19F:
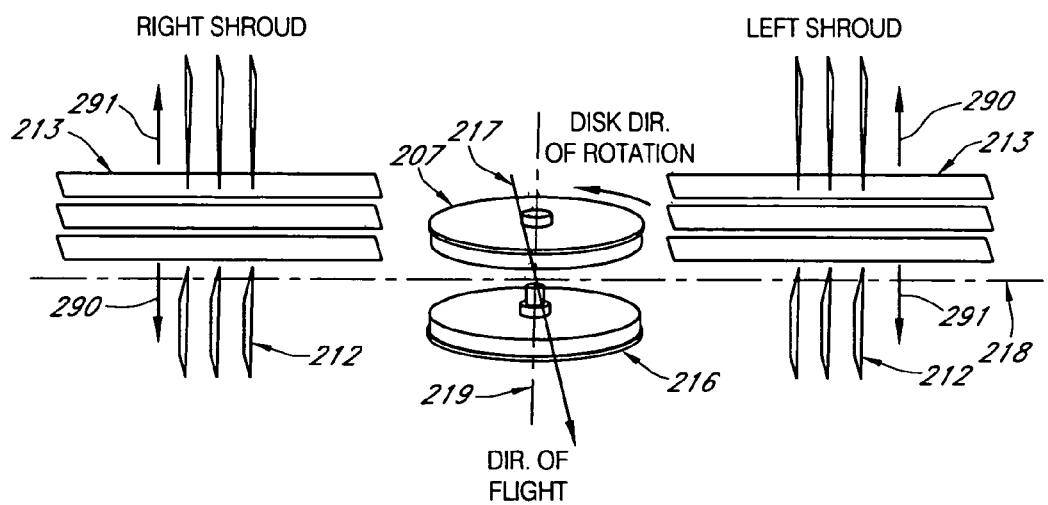

FIG. 19B shows an example orientation of the left and right control surfaces 212 that can effectuate the pitch of the air vehicle in vertical flight. In forward flight the air vehicle's pitch motion can be controlled by differential deflection of left and right control surfaces 213 as illustrated in FIG. 19F.

Pitch is the longitudinal change of the aircraft about the pitch axis 218 that is substantially perpendicular to the longitudinal axis 217 and yaw axis 219. In effect, the forward edge of the fuselage is moving either up or down with respect to the rear edge. Due to the gyroscopic precession, the left and right control surfaces 212 can be both moved either left or right in order to effectuate a change in pitch of the aircraft for vertical flight and control surfaces 213 can be moved differentially (one up, and the other down) in order to effectuate a change in pitch in forward flight. In particular, moving the control surfaces 212 in a direction 290 for vertical flight (FIG. 19B) and control surfaces 213 in a direction 290 for forward flight (FIG. 19F), imparts a force on the rear of the aircraft which due to the precession of the aircraft, results in the forward edge of the fuselage 201 moving up with respect to the rear edge. Similarly, moving the left and right control surfaces 212 in the direction 291 for vertical flight (FIG. 19B) and control surfaces 213 in a direction 291 for forward flight (FIG. 19F) can result in the forward edge of the fuselage 201 dipping downward with respect to the rear edge.

Another way of controlling the aircraft pitch in vertical flight is by adjusting, for the left or right shrouded propeller 203, blade angle of attack as shown in FIG. 19C. By reducing or increasing blades angle of attack the shrouded propeller thrust is reduced or increased accordingly. When the left shrouded propeller thrust is reduced and the right shrouded propeller thrust is maintained substantially constant or increased (depicted as arrows 291) the fuselage nose can pitch down. Similarly, when the left shrouded propeller thrust is increased and the right propeller thrust is reduced or maintained substantially constant (depicted as arrows 290) the aircraft nose can pitch up.

Figure 19G:
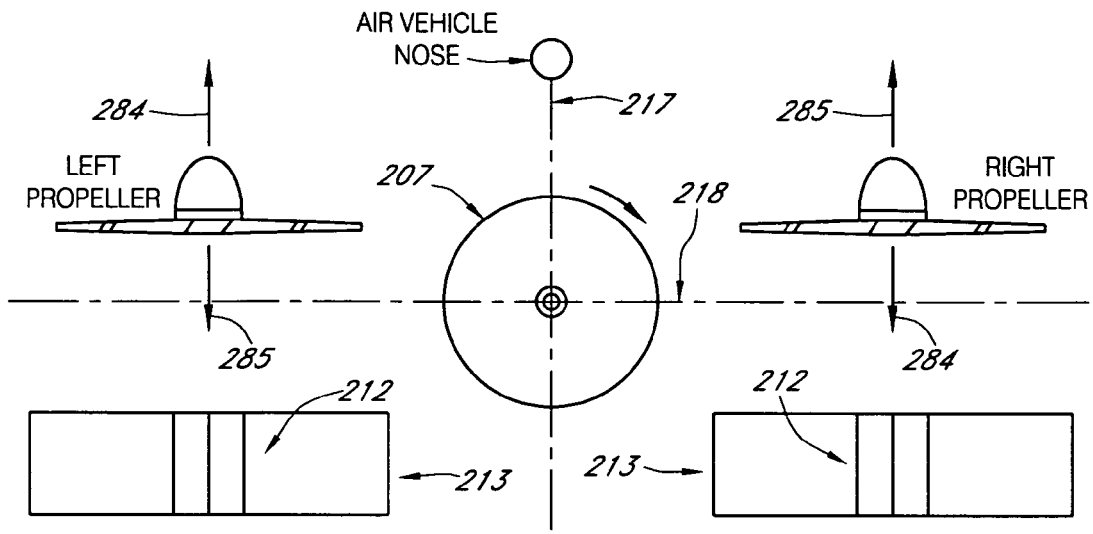

In forward flight, as shown in FIG. 19G, when the left shrouded propeller thrust is reduced and the right shrouded propeller thrust is maintained substantially constant or increased (depicted as arrows 285) the aircraft can yaw left. Similarly, when the left shrouded propeller thrust is increased and the right propeller thrust is reduced or maintained substantially constant (depicted as arrows 284) the aircraft can yaw right.

Figure 19H:
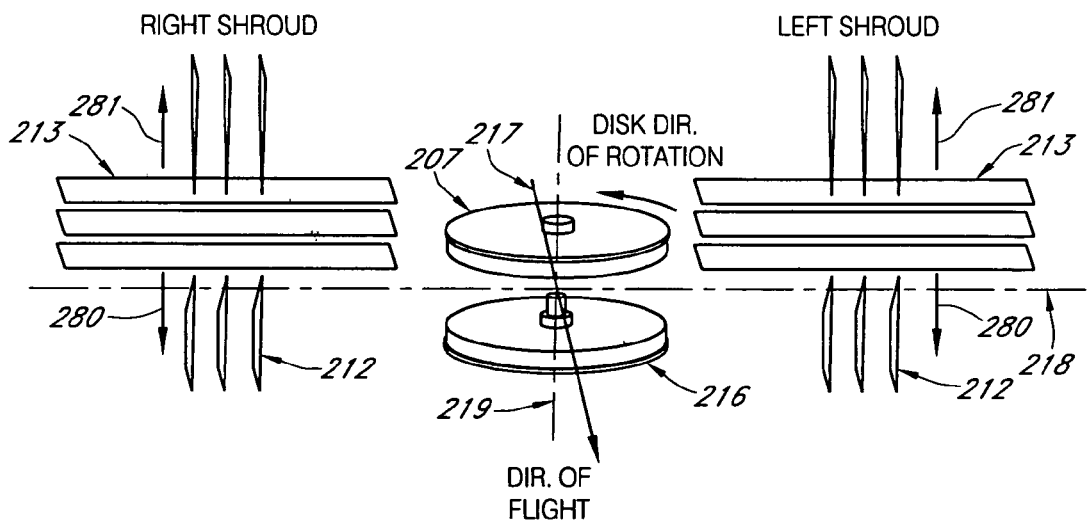

FIGS. 19D and 19H show the orientation of the left and right control surfaces 213 that can effectuate a roll in vertical flight (FIG. 19D) and forward flight (FIG. 19H), i.e. a change in orientation about the longitudinal axis 217. In particular, in order to induce a left roll, both left and right control surfaces 213 can be moved together in the direction 280 so that a greater surface area of the control surface is exposed to the thrust in the direction of the arrows 280 so as to exert a downward force on the left wing of the aircraft. Similarly, to get the aircraft to roll right, both left and right control surfaces 213 can be moved in the opposite direction, i.e. in the direction of the arrows 281. In one embodiment, Class III air vehicle roll control surfaces and functions can remain substantially the same throughout the flight envelope.

Hence, the stability of the aircraft can be enhanced as a result of having a gyroscopic stabilization member that translates one more forces exerted against the aircraft into gyroscopic precession, i.e. a change in the angular orientation of the aircraft. The relatively slow rate of change in the orientation of the aircraft allows for greater stability which thereby allows the aircraft to more successfully transition between vertical flight and substantially horizontal flight (for example, from vertical flight to substantially horizontal flight).

Figure 20A:
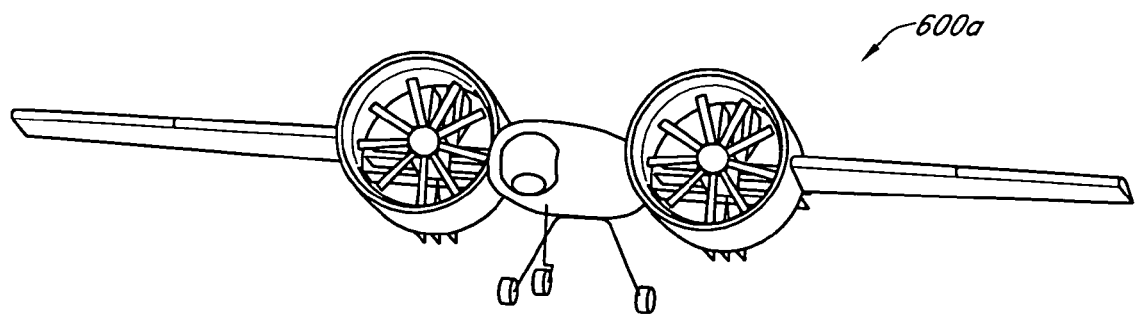
FIGS. 20A-20C show an example transition between forward flight and vertical takeoff and landing for one embodiment of a Class III air vehicle.
Figure 20B:
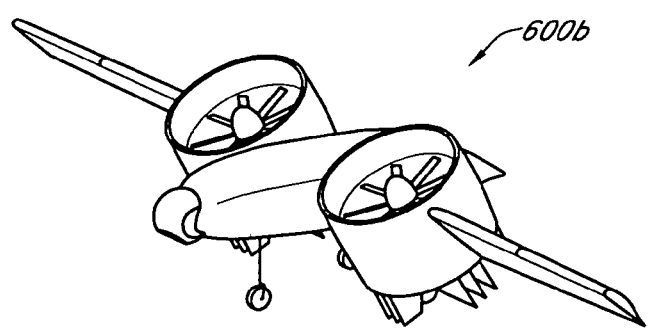
Figure 20C:
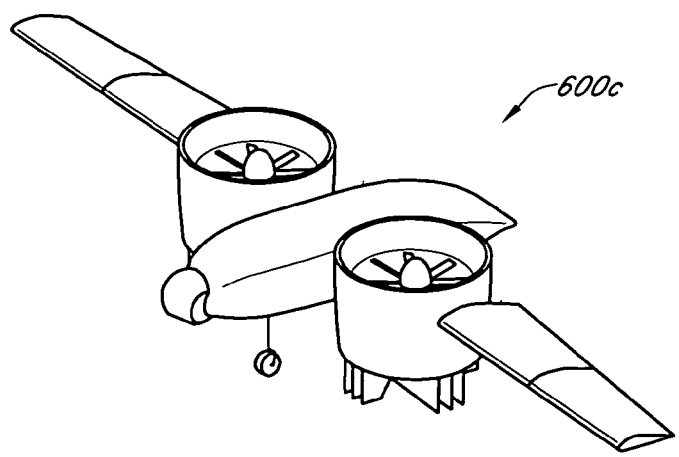

In some embodiments, Class III UAVs can be designed to operate in vertical takeoff and landing (VTOL) mode, short takeoff and landing (STOL) mode and conventional takeoff and landing (CTOL) mode. In one embodiment, to takeoff and land on the vertical the shrouded propellers 202 can have a generally vertical orientation and the fuselage 201 a generally horizontal orientation. The landing gear such as a tricycle type landing gear 210 and 211, can be attached to the fuselage. An example of a vertical takeoff is depicted in FIG. 20C. After leaving the ground the shrouded propellers 202 can then tilt forward in a particular direction with respect to their longitudinal axes 220 and 221. An example of such a transition configuration is depicted in FIG. 20B. In one embodiment, such a tilt can be approximately 10 to 15 degrees from the perpendicular axis. As the aircraft gains forward speed, the shrouded propellers can tilt forward to a forward flight angle of attack. An example of such forward flight configuration is depicted in FIG. 20A. In on embodiment, the forward flight angle of attach can be approximately 8-10 degrees or as required by the flight mission. In one embodiment, the fuselage 201 maintains its generally horizontal orientation.

Figure 21A:
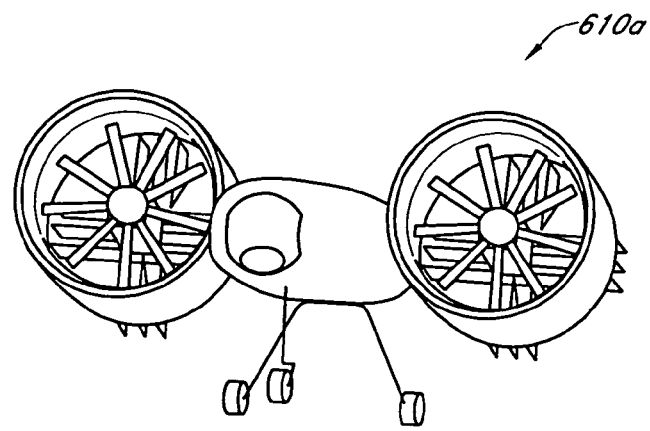
FIGS. 21A-21C show an example transition between forward flight and vertical takeoff and landing for another embodiment of a Class III air vehicle.
Figure 21B:
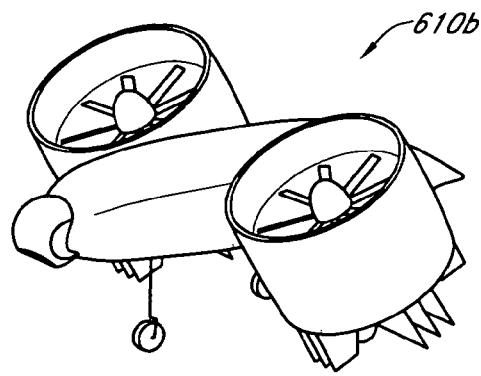
Figure 21C:
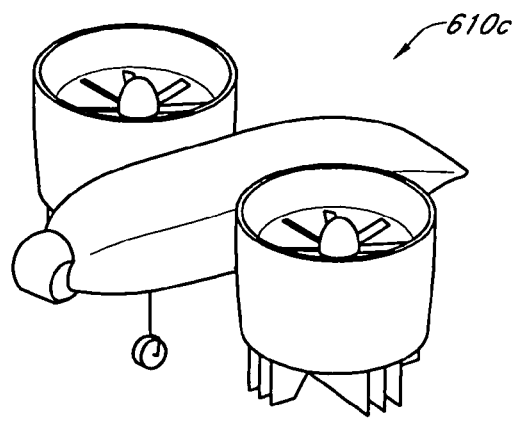

As described herein some embodiments of the Class III UAV can have wings, while some do not. For example, the air vehicle depicted in FIGS. 20A-20C includes wings. FIGS. 21A-21C show a Class III UAV without wings in a transition from a vertical takeoff to a horizontal flight, in a manner generally similar to that shown in FIGS. 20A-20C.

In some embodiments, for a short takeoff the shrouded propellers 202 can be tilted forward at an angle of approximately 15-20 degrees from the perpendicular axis. For a conventional takeoff the shrouded propellers can be tilted at an angle of approximately 70-75 degrees from the perpendicular axis. As the aircraft rolls forward at a certain forward speed it will lift off the ground and become airborne. The shrouded propellers can then be tilted forward to a forward flight angle of attack of approximately 8-10 degrees or as required by the flight mission. On landing the aircraft can land on the vertical, short landing with the shrouds tilted at approximately 15-20 degrees and conventional landing with the shrouds tilted at approximately 70-75 degrees from the perpendicular axis. The short and conventional takeoff could be used to increase the aircraft payload capability.

Flying forward with the shrouds at a very high angle of attack is limited by the forward speed. Flying forward the inner surfaces of the shroud 102, the fuselage 101 and the wings 109 are forming the flight surfaces in a well-known manner. It will, however, be appreciated that, as the speed of the aircraft is increased in the transition mode, turbulence can result in the shrouded propellers that could reduce the shrouded propeller thrust and stress the propeller blades.

Consequently, ducted fan aircrafts have a relatively low maximum horizontal flight speed in the hover mode. Moreover, due to the instability associated with these particular aircraft, ducted fan aircraft have been unable to make the transition to full horizontal flight wherein the longitudinal axis 115 is substantially parallel to the plane of the earth or, alternatively, the plane of rotation of the propellers 102 is substantially perpendicular to the plane of the earth.

It will be appreciated that the inability of ducted fan aircraft to travel in a horizontal mode limits the upper speed of the aircraft which, in combat environments, can be too slow to protect the aircraft. By gyroscopically stabilizing the aircraft, the Applicant is capable of producing an aircraft that can make the transition from vertical flight or hover flight into substantially horizontal flight. This is due to the increase in the angular momentum of the aircraft and the fact that the rate of change in the angular orientation of the aircraft due to external forces is decreased approximately by the ratio of the angular momentum to the moment of inertia of the aircraft. Hence, due to the increased stability, the Applicant can fly a shrouded propeller configuration of aircraft in a vertical mode, a hover mode and a horizontal mode.

The shrouded propeller air vehicle has a much lower disk loading (ratio between the propeller disk area and the air vehicle's weight) than the disk loading of a ducted fan air vehicle. The lower disk loading can enable a shrouded propeller air vehicle to carry significantly more payload and have a much longer endurance in hover and forward flight.

Class III air vehicle has a significant advantage over the ducted fan when landing in adverse weather conditions. When landing on the vertical in windy conditions a ducted fan has to tilt into the wind and land at an angle to the ground surface. This situation may lead to the possibility of the air vehicle flipping over and rolling on the landing surface. Landing in cross winds becomes more critical when the ducted fan has to land on a rolling and pitching landing platform of a Navy vessel. In one embodiment, Class III fuselage remains generally parallel to the landing surface. As the air vehicle approaches the landing surface only the shrouded propellers tilt into the wind. The air vehicle can land on the vertical and can even roll forward a few feet before coming to a complete stop.

Example Configuration for One Embodiment of a Class II UAV

Table 1 provides a list of estimated performance characteristics for one example embodiment of a Class II UAV. Other configurations are possible.

TABLE 1

| Description | Characteristic |
| --- | --- |
| Power plant | 1 × 372 cc |
| Power available for VTOL thrust | 30 HP |
| Shrouded prop inside diameter | 21 in |
| Shrouded prop exit diameter | 22 in |
| Shrouded prop outside diameter | 27 in |

TABLE 1-continued

| Description | Characteristic |
| --- | --- |
| Air vehicle height (VTOL) | 30 in |
| Span (without wings) | 60 in |
| Span (with wings) | 13 ft |
| Empty weight (without wings) | 102 lb |
| Wings weight | 8 lb |
| Fuel weight (without wings) | 48 lb |
| Fuel weight (with wings) | 30 lb |
| Payload weight | 20 lb |
| Maximum vertical takeoff weight | 170 lb |
| Air speed for optimized endurance | 60 kts |
| Air speed for optimized range | 80 kts |
| Endurance—hover at range | 3.2 hrs |
| Endurance—loiter (with wings) | 7 hrs |
| Altitude | 25,000 ft |
| Range | 16 km |

Example Configuration for One Embodiment of a Class III UAV

Table 2 provides a list of estimated performance characteristics for one embodiment of a Class III UAV. Other configurations are possible.

TABLE 2

| Description | Characteristic |
| --- | --- |
| Power plant | 2 × 280 cc |
| Power available for VTOL thrust | 2 × 25 HP = 50 HP |
| Shrouded prop inside diameter | 21 in |
| Shrouded prop exit diameter | 22 in |
| Shrouded prop outside diameter | 27 in |
| Air vehicle height (VTOL) | 30 in |
| Air vehicle length | 60 in |
| Span (without wings) | 72 in |
| Span (with wings) | 14 ft |
| Empty weight (without wings) | 120 lb |
| Wings weight | 10 lb |
| Fuel weight (without wings) | 68 lb |
| Fuel weight (with wings) | 58 lb |
| Payload weight | 20 lb |
| Maximum vertical takeoff weight | 190 lb |
| Air speed for optimized endurance | 60 kts |
| Air speed for optimized range | 100 kts |
| Endurance—hover at range | 1.5 hrs |
| Endurance—loiter (with wings) | 4 hrs |
| Altitude | 25,000 ft |
| Range | 125 km |

Example Configuration of Flight Control System

Figure 22:
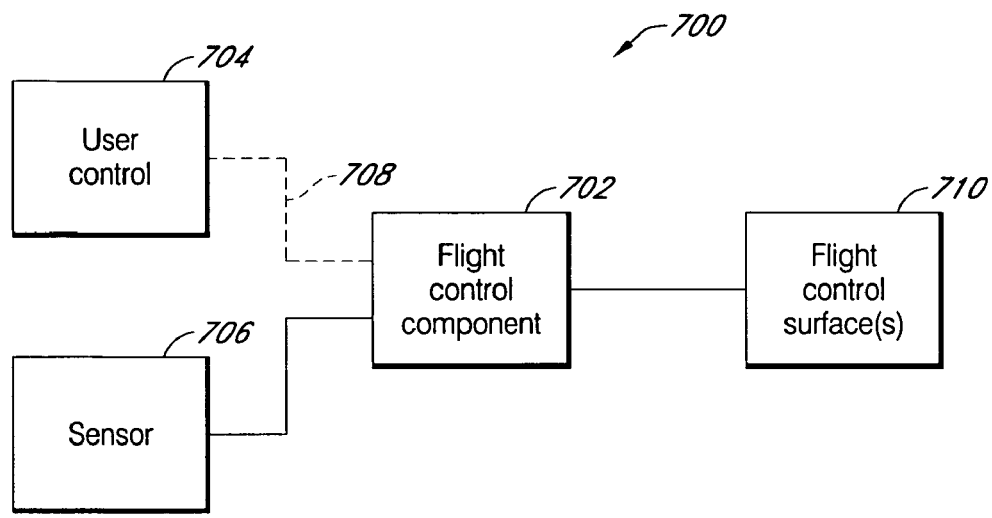
FIG. 22 shows a block diagram of one embodiment of a flight control system configured to provide flight control for some embodiments of the gyroscopically stabilized air vehicles of the present disclosure.

FIG. 22 shows a block diagram of one embodiment of a flight control system 700 that includes a flight control component 702. The flight control component 702 is depicted as receiving one or more input signals from a user control 704 and/or one or more sensors 706. A dashed line 708 indicates that the input from the user control 704 can be wireless (for example, when remotely controlled) or wire-based. In one embodiment, an input from the user control 704 may include a control instruction indicative of the user's desire to change the existing flight parameter(s) (for example, direction of flight or transition between vertical and horizontal flight). For the purpose of description of FIG. 22 (and FIG. 23), a "user" can include a human operator or a set of programmed instructions.

In one embodiment, an input from the sensor 706 can include one or more signals indicative of changes or sudden perturbations of the existing flight parameter(s). For example, as described above, effects such as sudden wind gusts or consumption of fuel can result in relatively sudden or relatively gradual changes that can affect the direction and/or attitude of the air vehicle.

As shown in FIG. 22, the flight control component 702 can receive such inputs and generate one or more output signals for effectuating the adjustments of the flight control surface(s). In some embodiments, such adjustments of the flight control surface(s) induce a precession of the angular momentum of the gyroscopic stabilization member. Examples of such examples have been described above.

Figure 23:
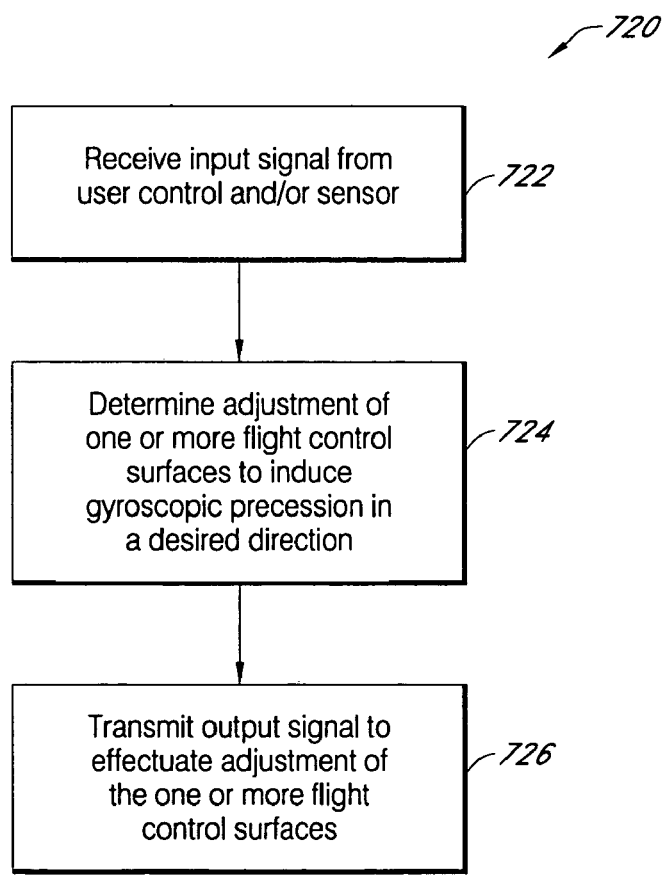
FIG. 23 shows one embodiment of a process for providing flight control for some embodiments of the gyroscopically stabilized air vehicles of the present disclosure.

FIG. 23 shows one embodiment of a process that can be performed by the flight control component 702 of FIG. 22. In a process block 722, input signal is received from a user control and/or a sensor. In one embodiment, the input signal is indicative of a need or a desire to change at least one of the air vehicle's pitch, yaw, and roll orientation. In a process block 724, the process 720 determines an adjustment of one or more flight control surfaces to induce gyroscopic precession in a desired direction. In a process block 726, one or more output signals are transmitted to effectuate the adjustment of the one or more flight control surfaces.

Example Configuration of Gyroscopic Stabilization Member

In some embodiments, the gyroscopic stabilization (GS) member can be configured to accommodate different flight requirements or characteristics. Dimensions, total mass, mass-distribution, or any combination thereof, can be adjusted to provide a desired angular momentum of the GS member.

In some embodiments, the desired angular momentum can be chosen depending on various factors. For example, having a relatively large angular momentum can provide more GS stabilization. In some situations, such stabilization can be at the expense of maneuverability, which may or may not be desirable. In some embodiments, such conflicting flight characteristics can be accommodated by allowing for adjustments to the GS member—by changing the moment of inertia of the GS member (by replacement, for example) and/or by changing the rotational speed of the GS member. For example, an initial GS configuration may provide a relatively large angular momentum, thereby providing a very stable and steady air vehicle for a pilot to become familiar with the air vehicle's flight characteristics. As the pilot's expertise in flying the air vehicle increases, the angular momentum of the GS member may be reduced, thereby providing greater maneuverability. In some embodiments, the angular momentum may further be reduced when the air vehicle is controlled by an airborne computer.

Figure 24A:
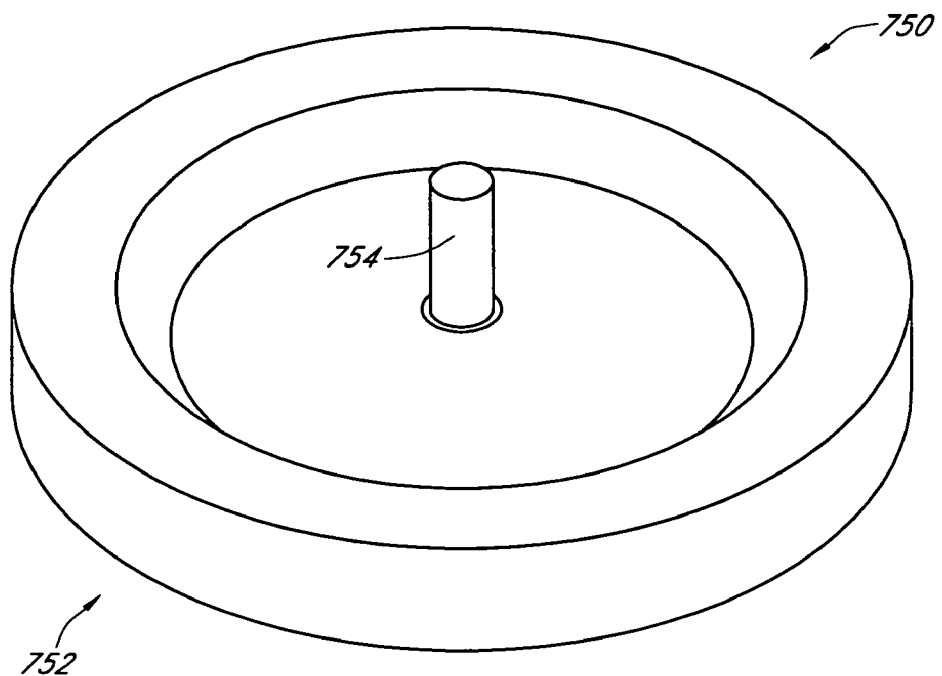
FIGS. 24A and 24B show different views of one example embodiment of a disk member that can be used to provide gyroscopic stabilization.
Figure 24B:
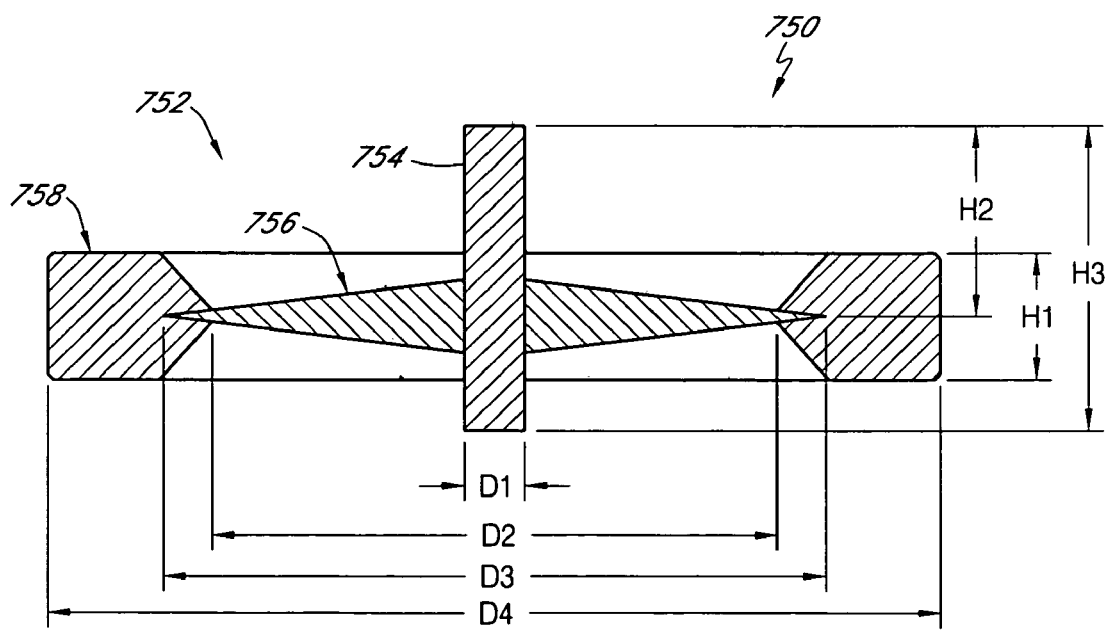

FIGS. 24A and 24B show different views of one embodiment of a disk member 750 that can be used as a gyroscopic stabilization (GS) member. As shown, the disk member 750 can include a disk 752 mounted to a shaft 754. In one embodiment, the disk 752 can be spun by coupling the shaft to a power source (for example, coupling an engine shaft via a gear box) in various known manners.

For the example embodiments described above in reference to Tables 1 and 2, one embodiment of the disk member 750 can include a precision machined steel shaft 754, a middle (radial) section 756 and an outer section 758. The middle section 756 and the outer section 758 can be fabricated from high strength carbon fiber. The disk's angular momentum varies substantially directly with its rotational velocity and its moment of inertia. In one embodiment, as shown in FIGS. 24A and 24B, mass can be distributed more towards the periphery of the disk to provide a greater moment of inertia (and thereby greater angular momentum for a given rotational rate) for a given total mass and overall dimension of the disk 752.

In one example embodiment, the radial middle section includes unidirectional carbon fibers having a radial orientation. Multiple layers of fibers and the steel shaft are placed in an aluminum mold and cured at high temperature. After the radial middle section is cured the outer diameter is machined to the designed dimensions and the assembly is placed in the ring mold. The ring is fabricated of a continuous carbon fiber tow. As the disk mold assembly is rotated on an assembly fixture the continuous fiber, subjected to a pull force, is placed in the mold. The entire assembly is placed in a vacuum bag to substantially eliminate possible air bubbles and cured at high temperature. After the curing process, the outer ring surface layer is machined for uniformity. The disk is then dynamically balanced and become ready for installation. Should it be necessary, the mass of the outer section can be increased by weaving in one or more very thin continuous steel wire.

For the example Class II UAV described above in reference to Table 1, the above-described GS disk 750 can be spun at, for example, about 30,000 to 32,000 RPM. For the example Class III UAV described above in reference to Table 2, the above-described GS disk 750 can be spun at, for example, about 24,000 RPM. As described herein, other rotational rates are possible.

Examples of Variations of the Air Vehicle

Based on the foregoing description, it will be appreciated that many variations of gyroscopically stabilized air vehicle can be implemented. Some non-limiting example variations and/or alternate embodiments include, UCAV-type aircraft such as VTOL UCAV, MRE VTOL UCAV, and HALE VTOL UCAV; Class IV or larger UAVs such as Class IV VTOL UAV, MRE VTOL UAV, and HALE VTOL UAV; and manned aircraft such as One-Two seat M/U/C VTOL aircraft, Four-Six seat M/U/C VTOL aircraft, and 20-seat M/U/C VTOL aircraft. Other variations are possible.

For example, various features of the present disclosure can be applied to larger VTOL UAV designed to fulfill the FCS Class IV requirements. Due to their relatively long endurance, such air vehicles can provide continuous 72 hours reconnaissance coverage which could include 72 hours persistent stare.

In another example, a similar-sized aircraft as a single-seat or a Class IV could fulfill the role of a low cost VTOL UCAV. Its speed flexibility (0-350 mph), relatively high maneuverability and relatively small size can make it ideal to conduct missions in confined spaces like an urban environment or rough mountainous terrain. The aircraft can hover, fly at low speed and when necessary dash at high speed to escape enemy fire. Due to its gyroscopic stability and the fact that all its moving components are substantially entirely enclosed (in one embodiment) the aircraft can bump into land structures without changing its position in space. The aircrafts gyroscopic stability during such sudden impacts has been demonstrated in testing of various embodiments of the air vehicles of the present disclosure. The aircraft can provide a stable and steady platform for weapons delivery.

Other applications for larger air vehicles are also contemplated. Larger shrouded propeller aircrafts have been demonstrated in 1950s and 1960s. However, those programs did not succeed due to stability and control problems in vertical and transition to and from forward flight and also low payload capabilities. Applying materials technology the aircrafts could be built considerably lighter. For example, in 1950s and 1960s, such aircrafts were built of metal (aluminum and steel); whereas now, aircraft structures can be built using materials such as graphite composites that are considerably lighter and stronger. Also, today's engines have a higher power to weight ratio and better controls then the engines produced in 1960s.

In the description herein, various embodiments of the aircraft were described as having two propulsion units (for example two shrouded propellers). However, it will be understood that more than two (for example, four) propulsion units can be used.

In some embodiments, the air vehicles of the present disclosure can have propulsion systems other than the shrouded propellers. For example, turbofan engines or jet engines can be used.

In one embodiment, the shrouded propeller propulsion system can be replaced with large diameter turbofans, to provide speed and lifting capabilities of the aircraft. The turbofans can produce a more powerful jet blast on the take off and landing surface and as a result the vertical takeoff and landing may be restricted to prepared surfaces (concrete, metal, etc.). From unprepared surfaces the air vehicle can takeoff after a very short run and on landings rolling a short distance on the ground. A larger turbofan will provide adequate mixing of hot and cool exhaust gasses, thus reducing the infrared signature on landing surface and in flight.

Such high performance VTOL aircraft can be useful for Navy applications. The landing platforms are readily available and the aircraft's high speed and endurance can enable it to cover large distances. A medium to high speed VTOL air vehicle powered by turbofans can be configured for UAV and/or UCAV missions. As a manned aircraft it could find uses with special operations, executive aircraft, commuter aircraft, transport aircraft, etc.

Although the above-disclosed embodiments have shown, described, and pointed out the fundamental novel features of the invention as applied to the above-disclosed embodiments, it should be understood that various omissions, substitutions, and changes in the form of the detail of the devices, systems, and/or methods shown may be made by those skilled in the art without departing from the scope of the invention. Consequently, the scope of the invention should not be limited to the foregoing description, but should be defined by the appended claims.

What is claimed is:

1. An aircraft for vertical, horizontal or stationary flight, comprising:
   a fuselage;
   two shrouded propulsion assemblies;
   a plurality of control surfaces attached to the shrouded propulsion assemblies for controlling the flight of the aircraft;
   an engine mounted to the fuselage having an engine shaft arranged to rotate about a longitudinal axis of the aircraft;
   two propellers one in each shrouded propulsion assembly that produces thrust such that the aircraft is in flight and such that air flow is created over the plurality of control surfaces;
   a gyroscopic stabilization member attached to the engine shaft via a gear box such that the gyroscopic stabilization member rotates with an angular momentum that is selected, with respect to the moment of inertia of the aircraft about the axis of rotation of the gyroscopic stabilization member, such that the aircraft is gyroscopically stabilized during flight.

2. The aircraft of claim 1, wherein the gyroscopic stabilization member is a disk rotating about longitudinal axis of the aircraft.

3. The aircraft of claim 1, wherein the fuselage housing the gyroscopic stabilization member is solidly attached to the shrouds.

4. The aircraft of claim 1, wherein the gyroscopic stabilization member is a disk rotating about the yaw axis of the aircraft.

5. The aircraft of claim 1, wherein the fuselage housing the gyroscopic stabilization member is pivotably attached between the shrouds.

6. An aircraft comprising:
   a fuselage;
   two shrouded propulsion assemblies defining flight surfaces wherein the fuselage is mounted solidly between the two shrouded propulsion assemblies;
   a plurality of control surfaces attached to the shrouded propulsion assemblies for controlling the flight of the aircraft;
   an engine mounted in the fuselage;
   two propellers, one mounted in each shrouded propulsion assembly, actuated by the engine via belt drives or gear boxes, that produce thrust such that the aircraft is in flight and such that the airflow is created over the plurality of control surfaces wherein the engine provides sufficient thrust via the propellers so as to power the aircraft wherein the engine provides sufficient thrust via the propellers so as to power the aircraft through a flight envelope that includes vertical take off and landing and horizontal flight and transitions there between;
   a gyroscopic stabilization member comprising a disk structure actuated via a gear box by the engine, the disk structure situated in the fuselage in between the two shrouded propulsion assemblies.

7. The aircraft of claim 6, wherein the disk has a relatively small cross section, wherein no portion of the disk extends into the opening of the two shrouds.

8. An aircraft comprising:
   a fuselage;
   two shrouded propulsion assemblies defining flight surfaces wherein the fuselage is mounted pivotably between the two shrouded propulsion assemblies;
   a plurality of control surfaces attached to the shrouded propulsion assemblies for controlling the flight of the aircraft;
   an engine mounted in the fuselage;
   two propellers, one mounted in each shrouded propulsion assembly, actuated by the engine via interconnecting shafts and gear boxes that produce thrust such that the aircraft is in flight and such that the airflow is created over the plurality of control surfaces wherein the engine provides sufficient thrust via the propellers so as to power the aircraft wherein the engine provides sufficient thrust via the propellers so as to power the aircraft through a flight envelope that includes vertical take off and landing and horizontal flight and transitions there between;
   a gyroscopic stabilization member comprising a disk structure actuated via a gear box by the engine, the disk structure situated in the fuselage in between the two shrouded propulsion assemblies.

9. The aircraft of claim 8, wherein the disk has a relatively small cross section, wherein no portion of the disk extends into the opening of the two shrouds.

10. An aircraft, comprising:
a fuselage having a longitudinal axis;
two shrouded propeller assemblies coupled to the fuselage, wherein each shrouded propeller assembly is spaced laterally from the fuselage and provides thrust, and has one or more control surfaces that direct at least a portion of air flow of the thrust so as to provide flight control of the aircraft;
an engine positioned within the fuselage and coupled to and providing power to the two shrouded propeller assemblies by a power transfer mechanism; and
a gyroscopic stabilization member positioned within the fuselage and coupled to the power transfer mechanism such that the gyroscopic stabilization member rotates about a rotational axis so as to yield a selected angular momentum with respect to the longitudinal axis and a moment of inertia of the aircraft, and thereby provide gyroscopic stabilization of the aircraft during flight.

11. The aircraft of claim 10, wherein each of the two shrouded propulsion assemblies are mounted to the fuselage in a fixed manner such that axes of rotation of the propellers are substantially fixed with respect to the longitudinal axis of the fuselage.

12. The aircraft of claim 11, wherein the aircraft is a Class II UAV.

13. The aircraft of claim 12, further comprising wings that extend laterally from the two shrouded propulsion assemblies so as to provide additional lifting surface during horizontal fight of the aircraft.

14. The aircraft of claim 10, wherein each of the two shrouded propulsion assemblies are mounted to the fuselage in a pivotable manner such that axes of rotation of the propellers can vary with respect to the longitudinal axis of the fuselage.

15. The aircraft of claim 14, wherein the aircraft is a Class III UAV.

16. The aircraft of claim 15, further comprising wings that extend laterally from the two shrouded propulsion assemblies so as to provide additional lifting surface during horizontal fight of the aircraft.

17. The aircraft of claim 10, wherein the power transfer mechanism includes an engine shaft, and wherein the gyroscopic stabilization member is driven by the engine shaft via a gear box.

18. The aircraft of claim 10, wherein the rotational axis of the gyroscopic stabilization member is substantially parallel to the longitudinal axis of the fuselage.

19. The aircraft of claim 10, wherein the rotational axis of the gyroscopic stabilization member is substantially perpendicular to the longitudinal axis of the fuselage.

20. The aircraft of claim 10, wherein the gyroscopic stabilization member comprises a disk.

21. The aircraft of claim 20, wherein the disk has a mass distribution that varies with radial distance from its rotational axis.

22. The aircraft of claim 20, wherein the disk spinning at an operational rotational rate has an angular momentum that is about 10 to 20 times or greater than the static moment of inertia of the aircraft about the rotational axis of the disk.

23. The aircraft of claim 10, further comprising a flight control component configured to receive an input signal indicative of a need or a desire to change an attitude of the aircraft, and generate an output signal for effectuating movement of the one or more control surfaces.

24. The aircraft of claim 23, wherein the movement of the one or more control surfaces induces a precession of the selected angular momentum of the gyroscopic stabilization member.

25. The aircraft of claim 10, wherein the fuselage between the two propulsion units provides a space suitable for a payload.

26. The aircraft of claim 25, wherein the total thrust provided by the two propulsion devices is substantially greater than a thrust from a single propulsion device that is substantially similar to each of the two propulsion devices, such that use of two propulsion devices and the fuselage allows for improved payload of the aircraft.

27. An aircraft, comprising:
a fuselage having a longitudinal axis;
two propulsion devices coupled to the fuselage, wherein each propulsion device provides thrust and has one or more control surfaces that directs at least a portion of air flow of the thrust so as to provide flight control of the aircraft; and
a gyroscopic stabilization member coupled to a power source such that the gyroscopic stabilization member rotates about a rotational axis so as to yield a selected angular momentum with respect to the longitudinal axis and a moment of inertia of the aircraft, and thereby provide gyroscopic stabilization of the aircraft during flight.

* * * * *